United States Patent
Kato

(10) Patent No.: US 10,176,037 B2
(45) Date of Patent: Jan. 8, 2019

(54) TRANSMISSION MANAGEMENT SYSTEM, COMMUNICATION METHOD, AND NON-TRANSITORY RECORDING MEDIUM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/526,534

(22) PCT Filed: Jan. 14, 2016

(86) PCT No.: PCT/JP2016/000164
§ 371 (c)(1),
(2) Date: May 12, 2017

(87) PCT Pub. No.: WO2016/117306
PCT Pub. Date: Jul. 28, 2016

(65) Prior Publication Data
US 2017/0329666 A1 Nov. 16, 2017

(30) Foreign Application Priority Data

Jan. 22, 2015 (JP) ................................. 2015-010604

(51) Int. Cl.
G06F 11/30 (2006.01)
G06F 11/07 (2006.01)
(Continued)

(52) U.S. Cl.
CPC .......... *G06F 11/0793* (2013.01); *H04M 3/56* (2013.01); *H04N 7/147* (2013.01); *H04N 7/15* (2013.01); *H04W 28/16* (2013.01)

(58) Field of Classification Search
None
See application file for complete search history.

(56) References Cited

U.S. PATENT DOCUMENTS

2002/0165773 A1* 11/2002 Natsuno ............ G06F 17/30867
705/14.58
2005/0264648 A1 12/2005 Ivashin et al.
(Continued)

FOREIGN PATENT DOCUMENTS

JP 2004-032305 1/2004
JP 2005-033828 2/2005
(Continued)

OTHER PUBLICATIONS

International Search Report dated Mar. 29, 2016 in PCT/JP2016/000164 filed on Jan. 14, 2016.
(Continued)

*Primary Examiner* — Mujtaba M Chaudry
(74) *Attorney, Agent, or Firm* — Oblon, McClelland, Maier & Neustadt, L.L.P.

(57) ABSTRACT

A disclosed transmission management system is for managing a first transmission terminal and a second transmission terminal, the first transmission terminal and the second transmission terminal communicating with each other via a relay apparatus which relays image data. The transmission management system includes a reception unit configured to receive, from the first transmission terminal, band information which indicates whether a bandwidth of communication between the relay apparatus and the first transmission terminal is equal to or narrower than a predetermined value, and a transmission unit configured to transmit, to the first transmission terminal, a message which indicates that image data transmitted from the second transmission terminal is hidden because the bandwidth is narrow in response to an event in which the reception unit receives the band information which indicates that the bandwidth is equal to or narrower than the predetermined value.

6 Claims, 17 Drawing Sheets

(51) Int. Cl.
*H04M 3/56* (2006.01)
*H04N 7/15* (2006.01)
*H04N 7/14* (2006.01)
*H04W 28/16* (2009.01)

(56) References Cited

U.S. PATENT DOCUMENTS

| | | | |
|---|---|---|---|
| 2006/0105724 A1* | 5/2006 | Nakao | H04B 7/061 |
| | | | 455/115.1 |
| 2006/0259635 A1 | 11/2006 | Hisatomi | |
| 2010/0067430 A1* | 3/2010 | Shinozaki | H04L 1/1835 |
| | | | 370/315 |
| 2011/0279640 A1 | 11/2011 | Choi | |
| 2012/0106595 A1* | 5/2012 | Bhattad | H04B 7/0421 |
| | | | 375/146 |
| 2014/0104373 A1 | 4/2014 | Kato et al. | |
| 2014/0253668 A1* | 9/2014 | Yoshida | H04N 7/15 |
| | | | 348/14.07 |
| 2014/0380299 A1 | 12/2014 | Nakamura | |
| 2016/0105642 A1 | 4/2016 | Nagase et al. | |

FOREIGN PATENT DOCUMENTS

| | | |
|---|---|---|
| WO | 2008/042852 A2 | 4/2008 |
| WO | WO 2014/196654 A1 | 12/2014 |
| WO | 2016/031200 A1 | 3/2016 |

OTHER PUBLICATIONS

Written Opinion of the International Preliminary Examining Authority dated Jul. 26, 2016 in PCT/JP2016/000164 filed on Jan. 14, 2016.

Extended European Search Report dated Jan. 4, 2018 in Patent Application No. 16739917.9, 11 pages.

* cited by examiner

[Fig. 1]
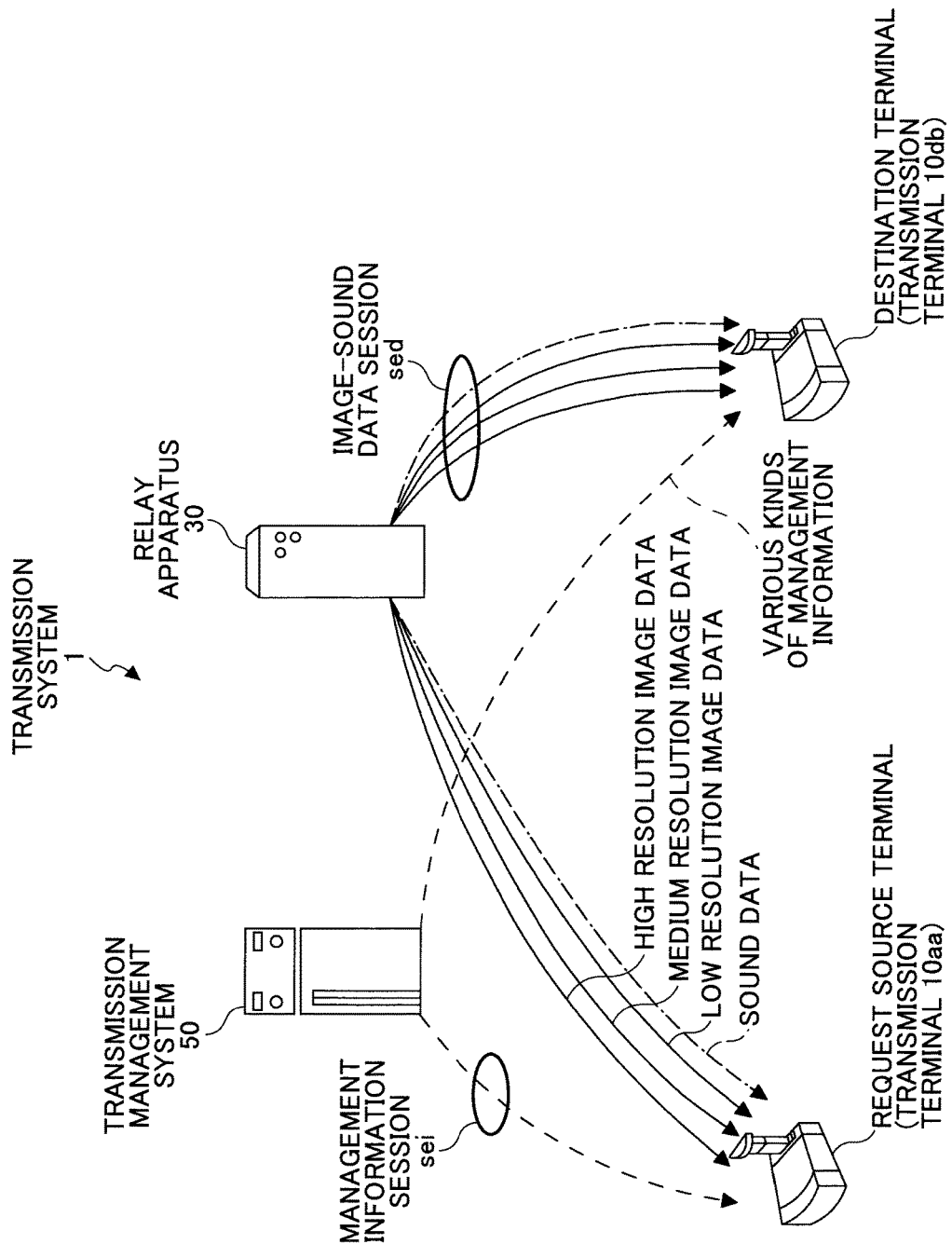

[Fig. 2]
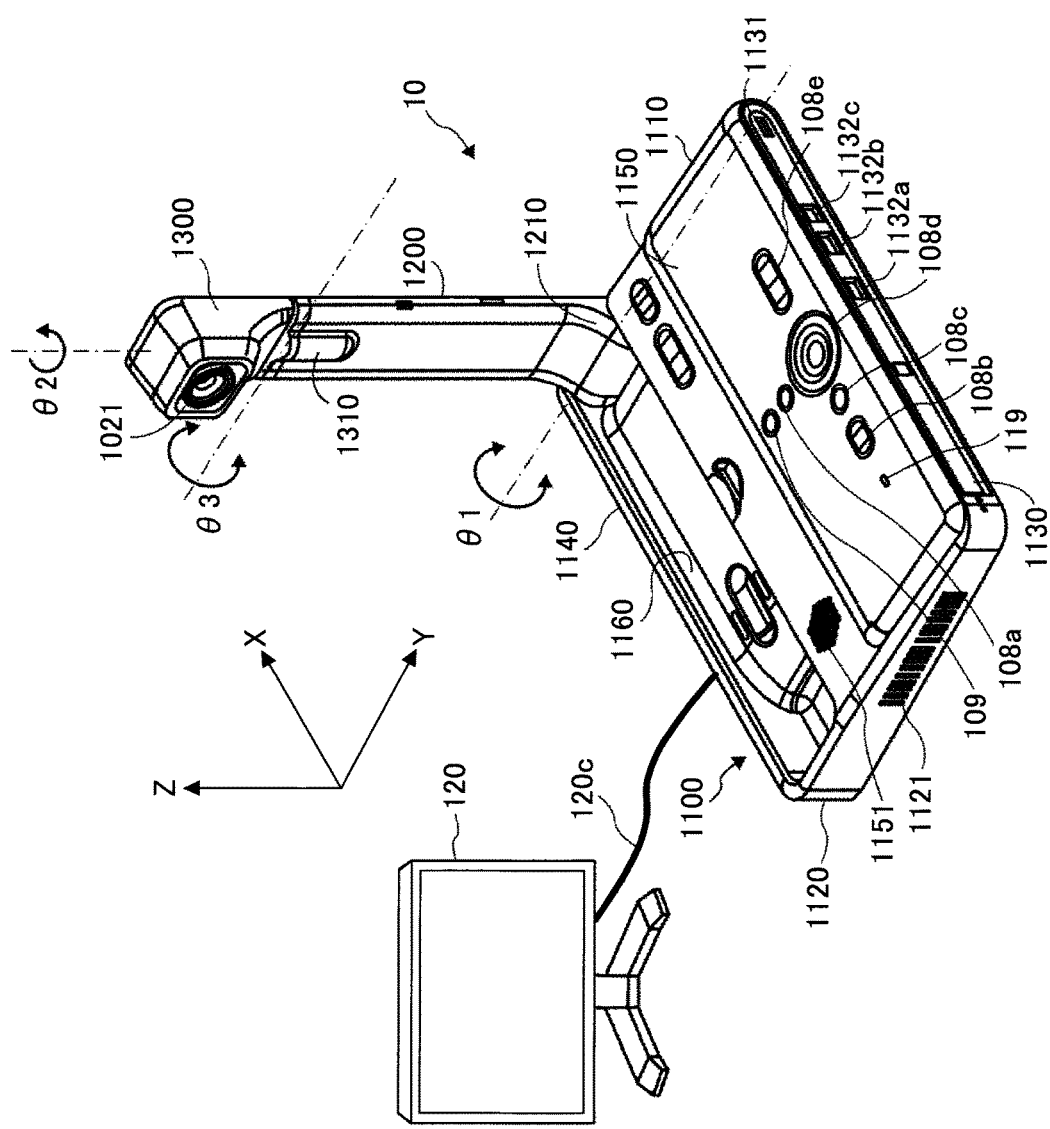

[Fig. 3]
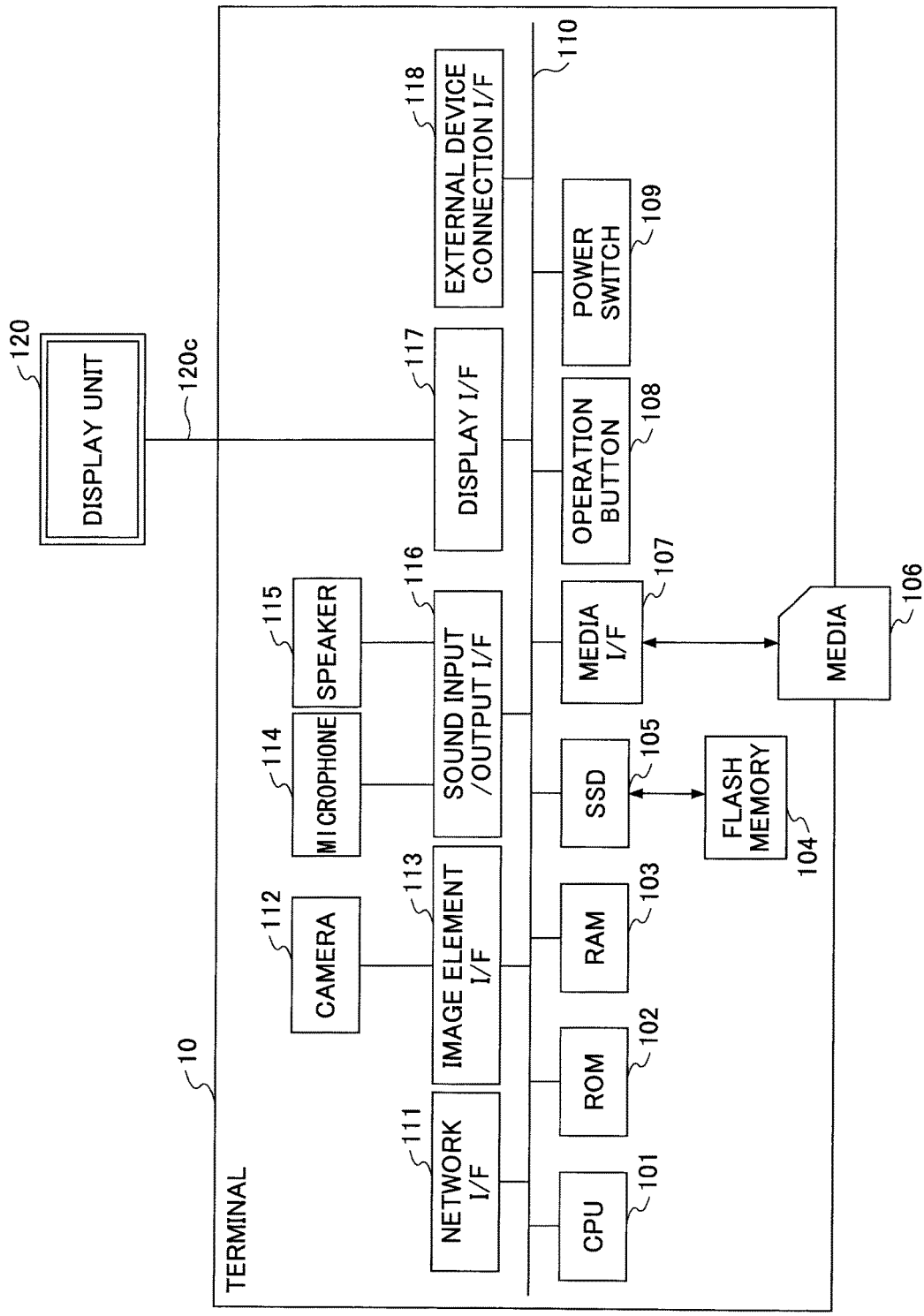

[Fig. 4]
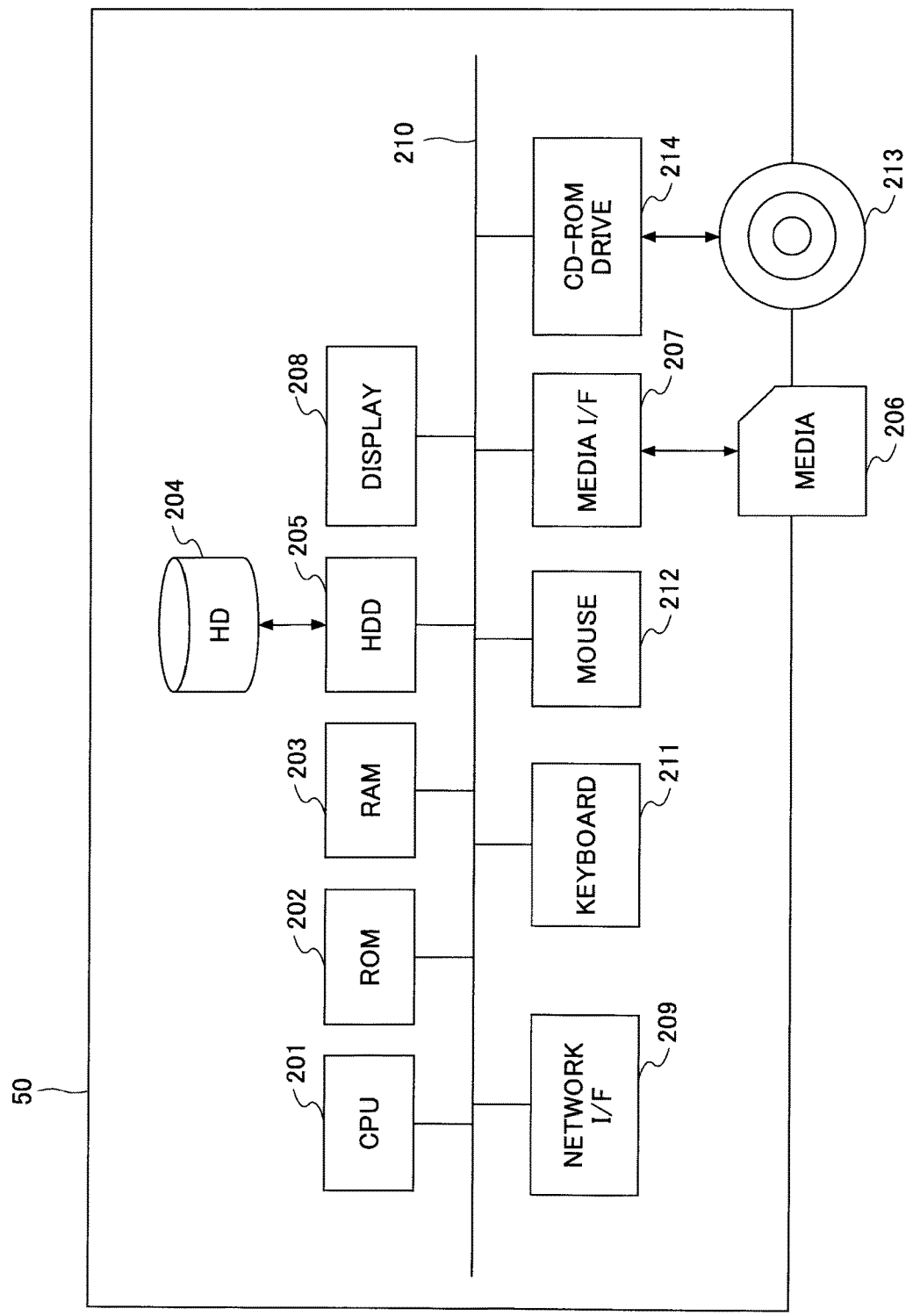

[Fig. 5]
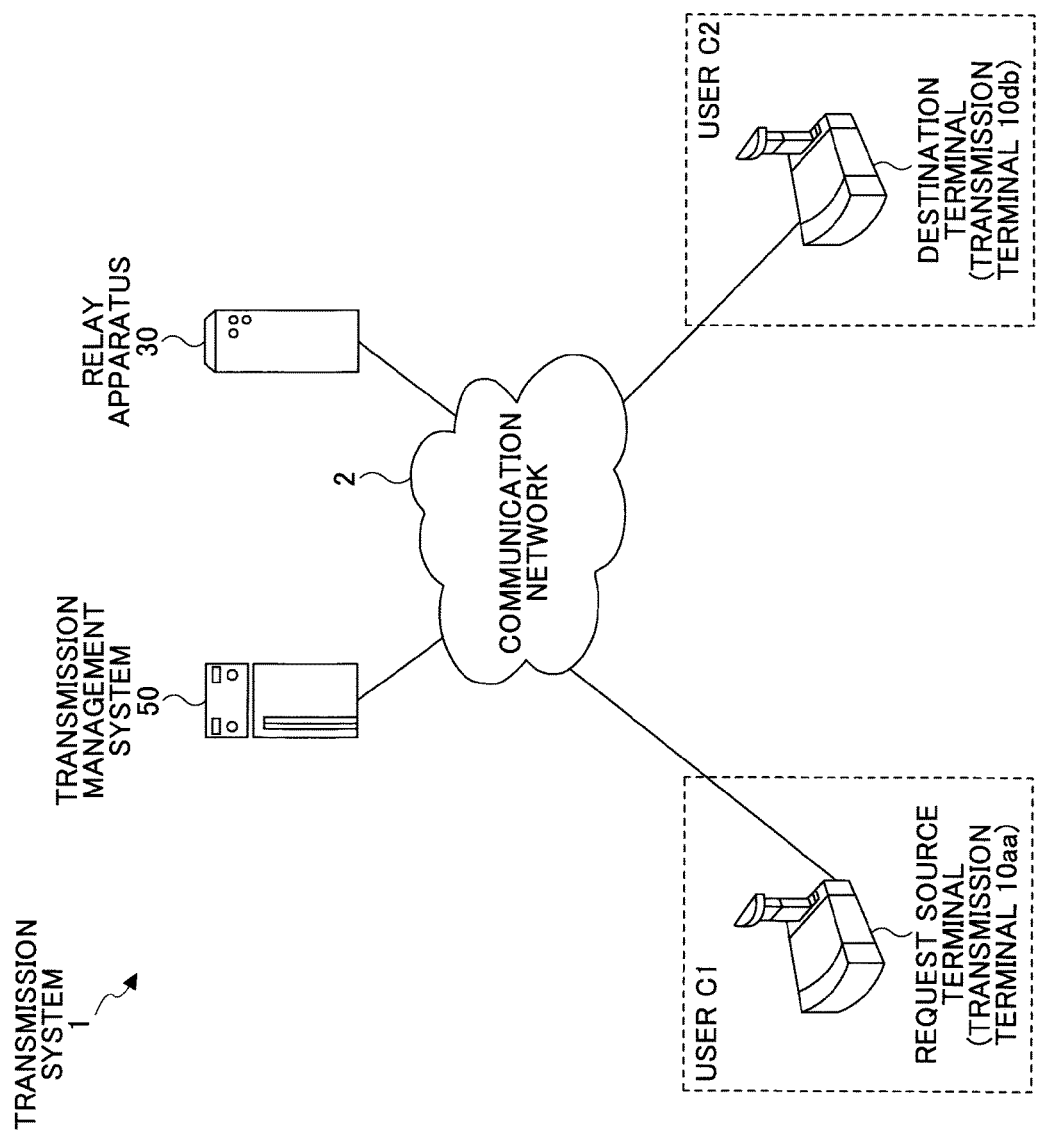

[Fig. 6]
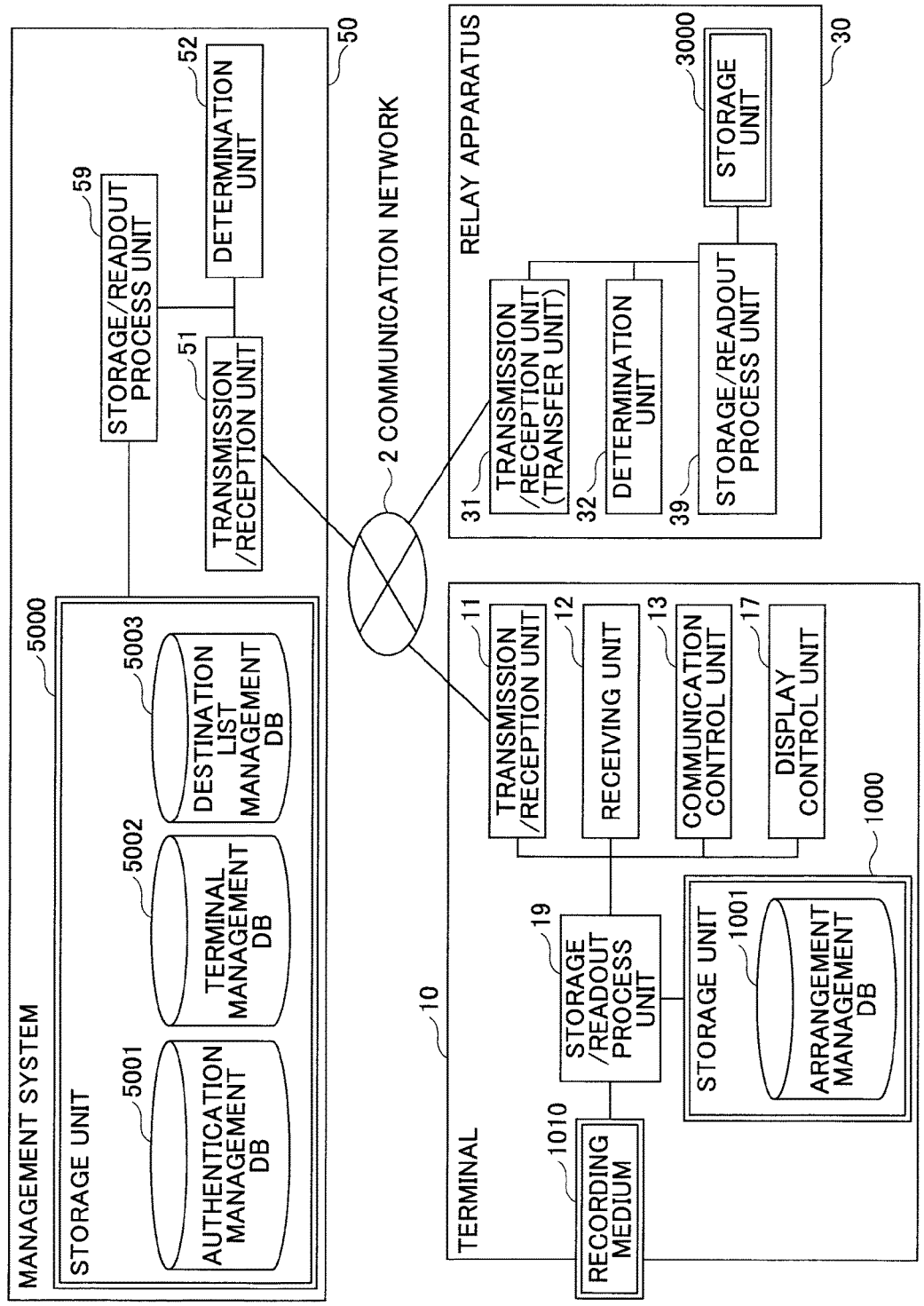

[Fig. 7A]
| SCREEN AREA NUMBER | TERMINAL ID OF DESTINATION TERMINAL | DESTINATION NAME |
|---|---|---|
| AREA 1 | 01db | DB TERMINAL LONDON OFFICE EUROPE |
| AREA 2 | 01aa | AA TERMINAL TOKYO OFFICE JAPAN |
[Fig. 7B]
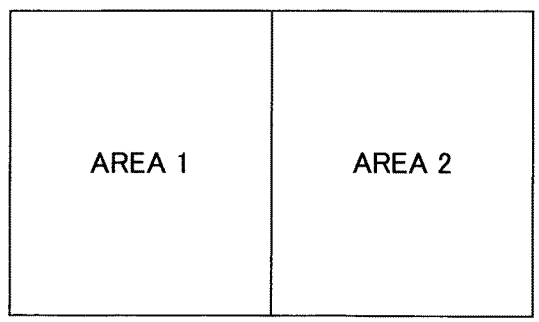

[Fig. 8A]
| SCREEN AREA NUMBER | TERMINAL ID OF DESTINATION TERMINAL | DESTINATION NAME |
|---|---|---|
| AREA 1 | 01db | DB TERMINAL LONDON OFFICE EUROPE |
| AREA 2 | 01aa | AA TERMINAL TOKYO OFFICE JAPAN |
| AREA 3 | 01ba | BA TERMINAL BEIJING OFFICE CHINA |
[Fig. 8B]
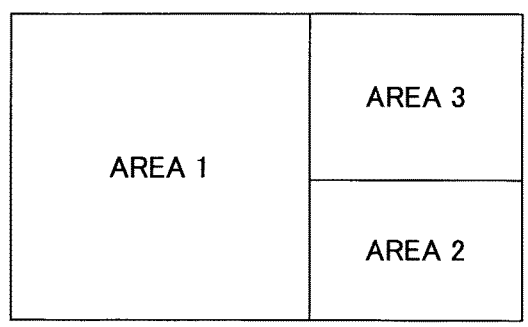

[Fig. 9]

| TERMINAL ID | PASSWORD |
|---|---|
| 01aa | aaaa |
| 01ab | abab |
| 01ba | baba |
| ... | ... |

[Fig. 10]

| TERMINAL ID | DESTINATION NAME | OPERATIONAL STATUS | RECEPTION TIME | IP ADDRESS OF TERMINAL |
|---|---|---|---|---|
| 01aa | AA TERMINAL TOKYO OFFICE JAPAN | ONLINE (COMMUNICABLE) | 2014.4.10.13:40 | 1.2.1.3 |
| 01ab | AB TERMINAL OSAKA OFFICE JAPAN | OFFLINE | 2014.4.09.12:00 | 1.2.1.4 |
| ... | ... | ... | ... | ... |
| 01ba | BA TERMINAL BEIJING OFFICE CHINA | ONLINE (COMMUNICABLE) | 2014.4.10.13:45 | 1.2.2.3 |
| 01bb | BB TERMINAL SHANGHAI OFFICE CHINA | OFFLINE (TEMPORARILY DISCONTINUE) | 2014.4.10.13:50 | 1.2.2.4 |
| ... | ... | ... | ... | ... |
| 01ca | CA TERMINAL WASHINGTON OFFICE USA | OFFLINE | 2014.4.10.12:45 | 1.3.1.3 |
| 01cb | CB TERMINAL NEW YORK OFFICE USA | ONLINE (COMMUNICATING) | 2014.4.10.13:55 | 1.3.1.4 |
| ... | ... | ... | ... | ... |
| 01da | DA TERMINAL BERLIN OFFICE EUROPE | ONLINE (COMMUNICATING) | 2014.4.08.12:45 | 1.3.2.3 |
| 01db | DB TERMINAL LONDON OFFICE EUROPE | ONLINE (COMMUNICABLE) | 2014.4.10.12:45 | 1.3.2.4 |
| ... | ... | ... | ... | ... |

[Fig. 11]

| REQUEST SOURCE TERMINAL ID | CANDIDATE OF TERMINAL ID OF DESTINATION TERMINAL |
|---|---|
| 01aa | 01ab,···,01ba,01bb,···,01ca,01cb,01da,01db,··· |
| 01ab | 01aa,01ca,01cb |
| 01ba | 01aa,01ab,01ca,01cb,01da,01db |
| ··· | ··· |
| 01db | 01aa,01ab,01ba,···,01ca,01cb,···,01da |

[Fig. 12]
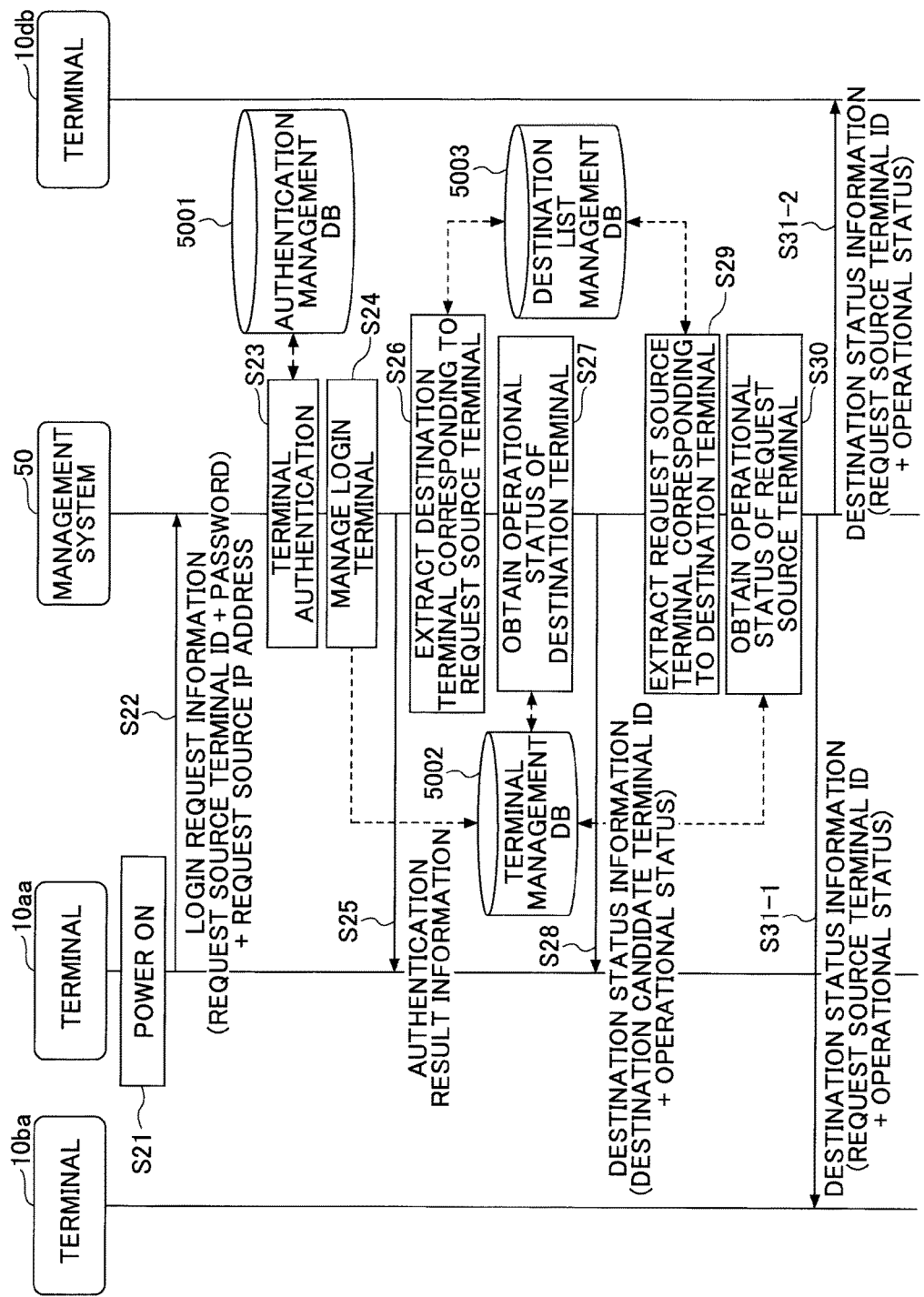

[Fig. 13]
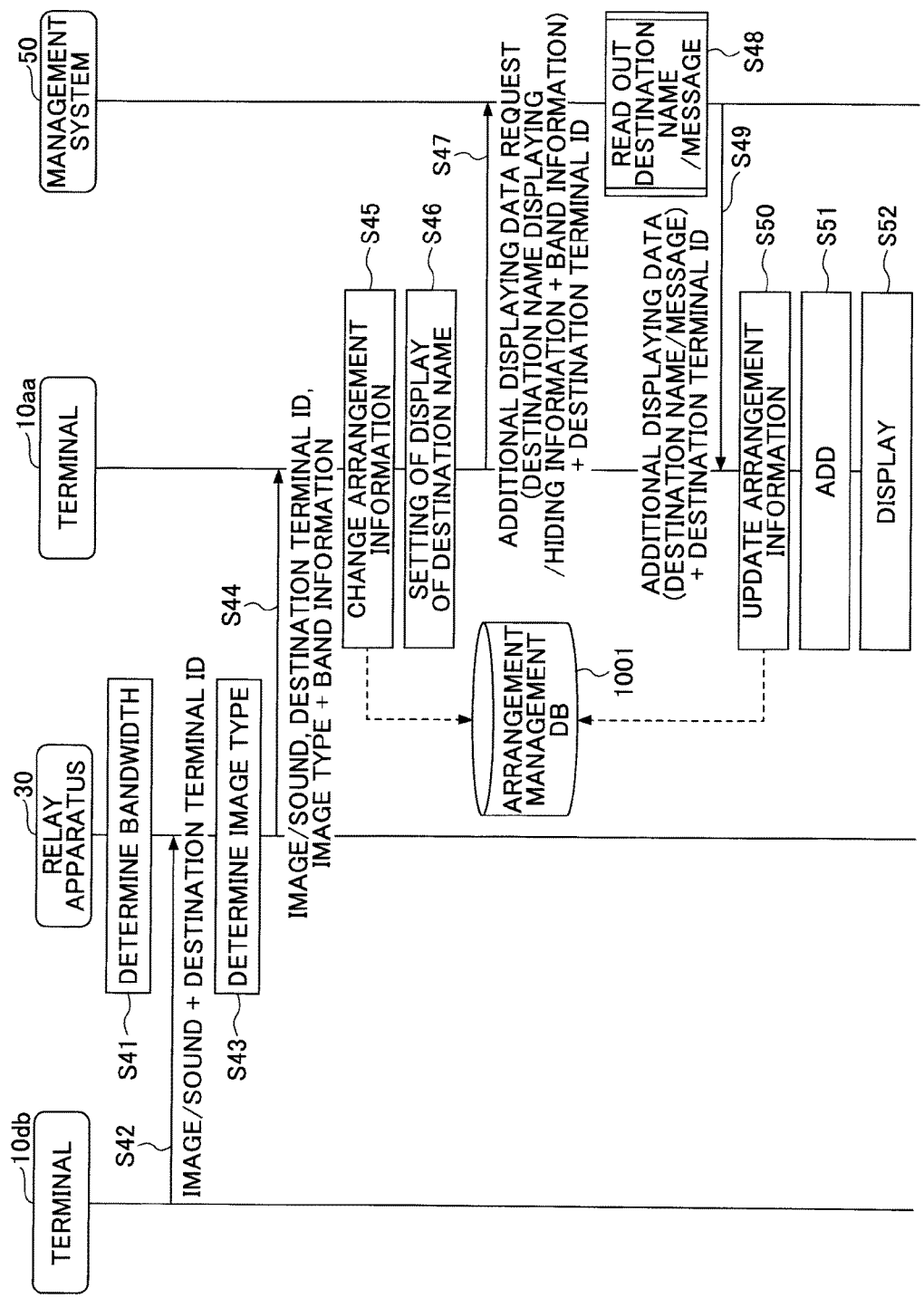

[Fig. 14]
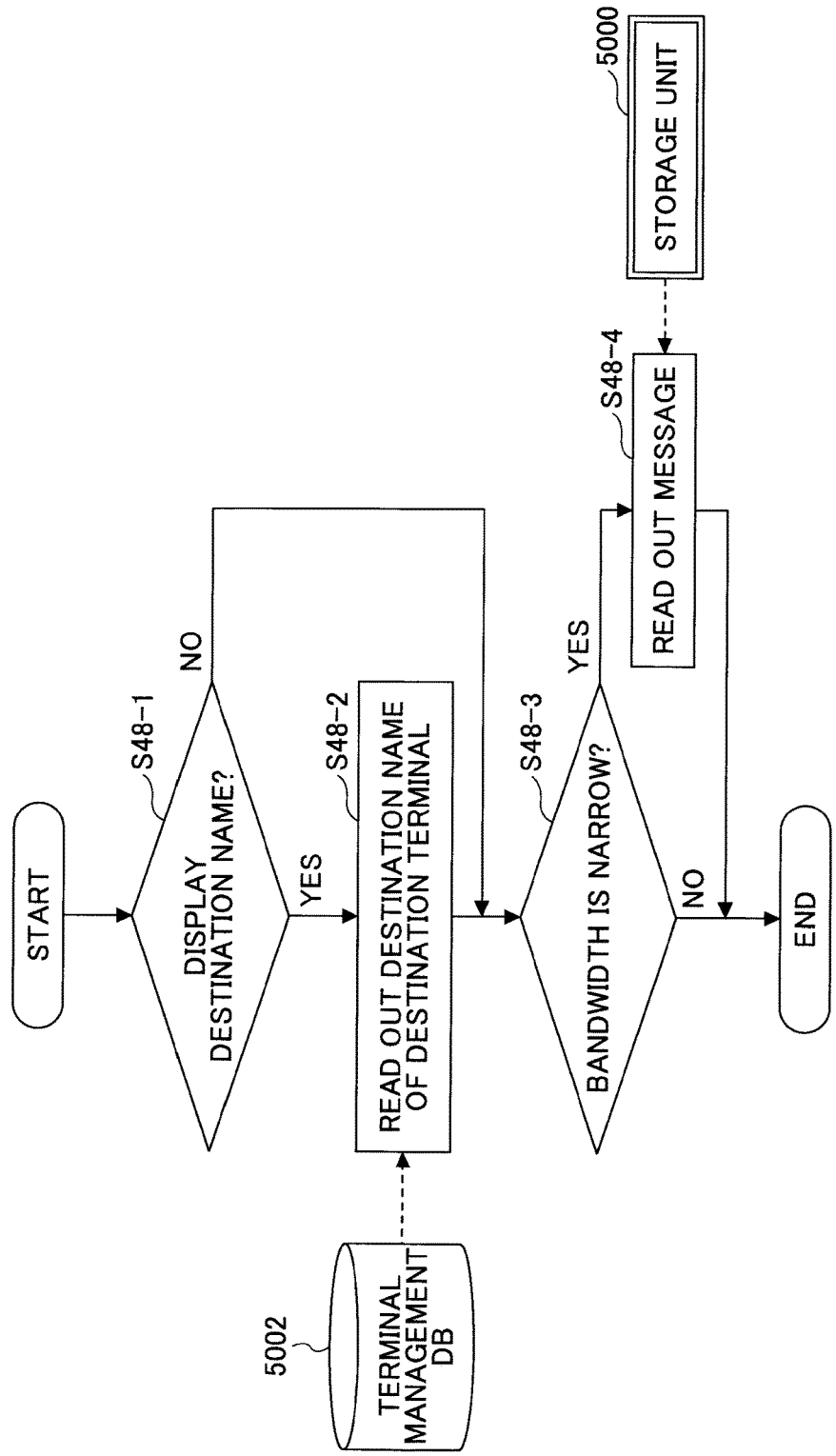

[Fig. 15A]
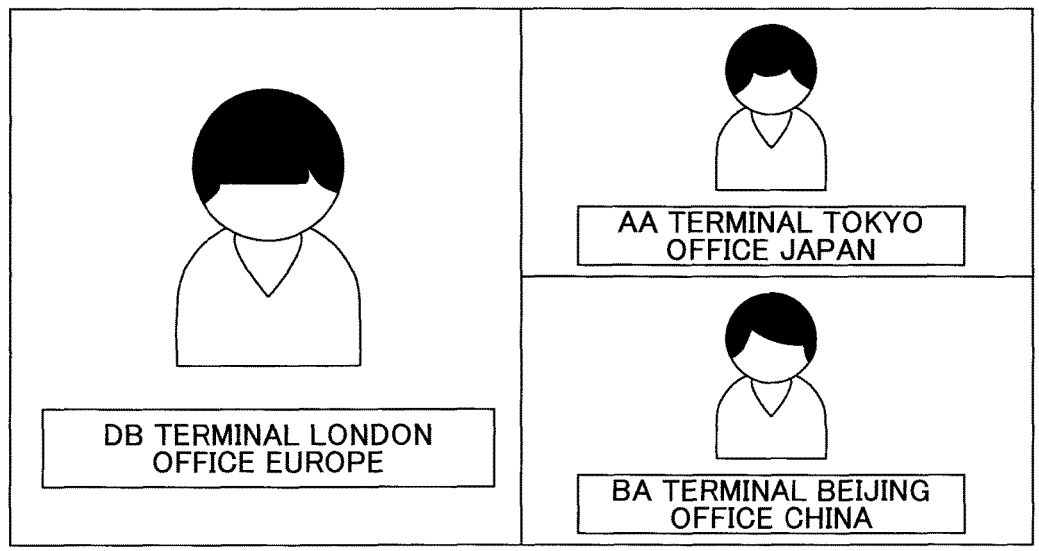
[Fig. 15B]
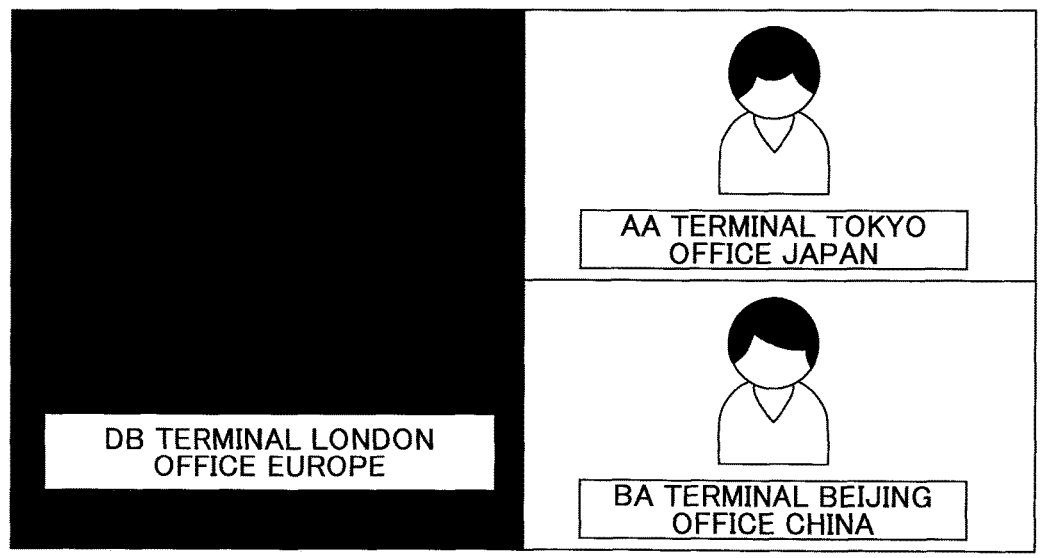

[Fig. 15C]
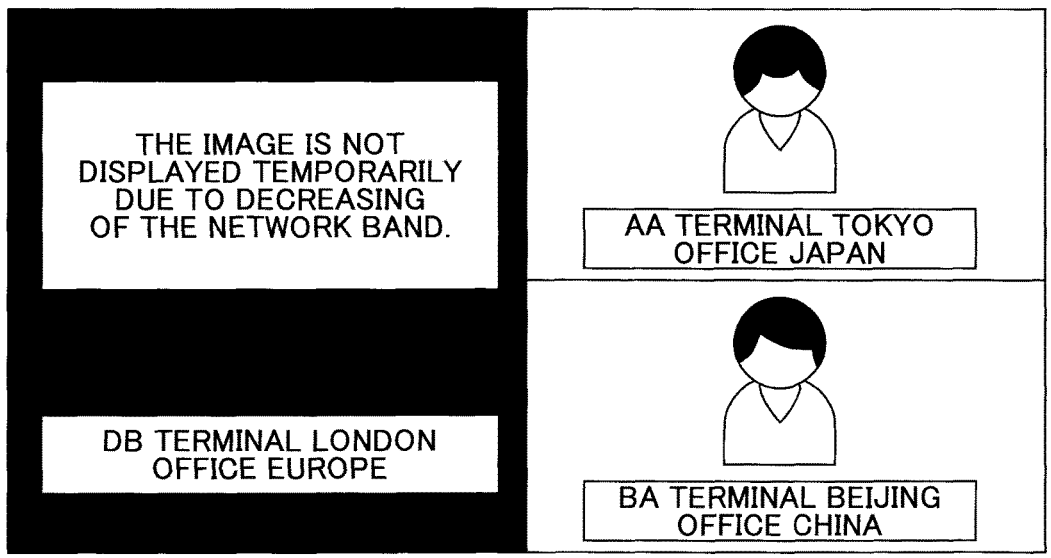
[Fig. 15D]
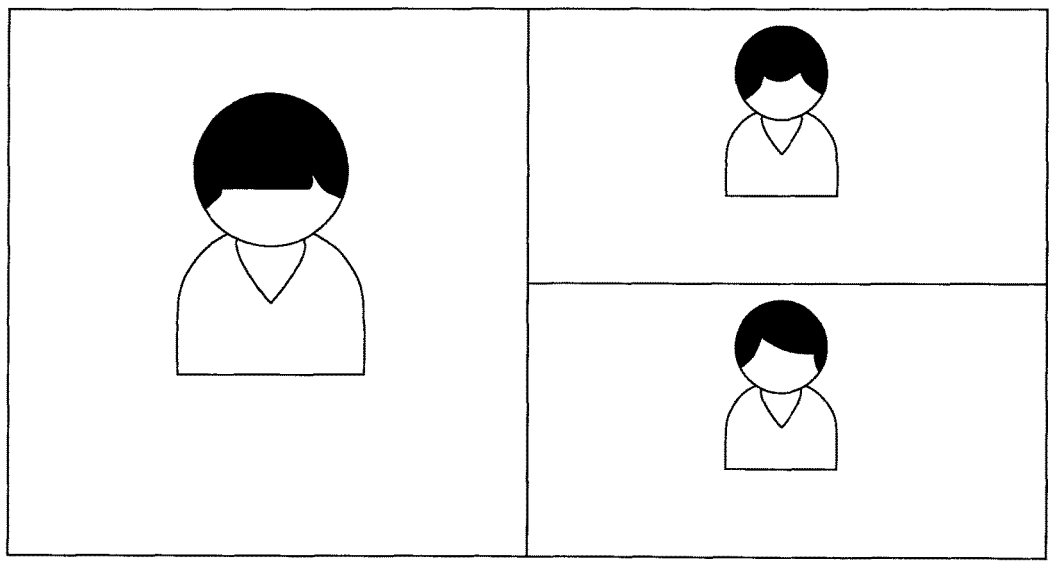

[Fig. 15E]
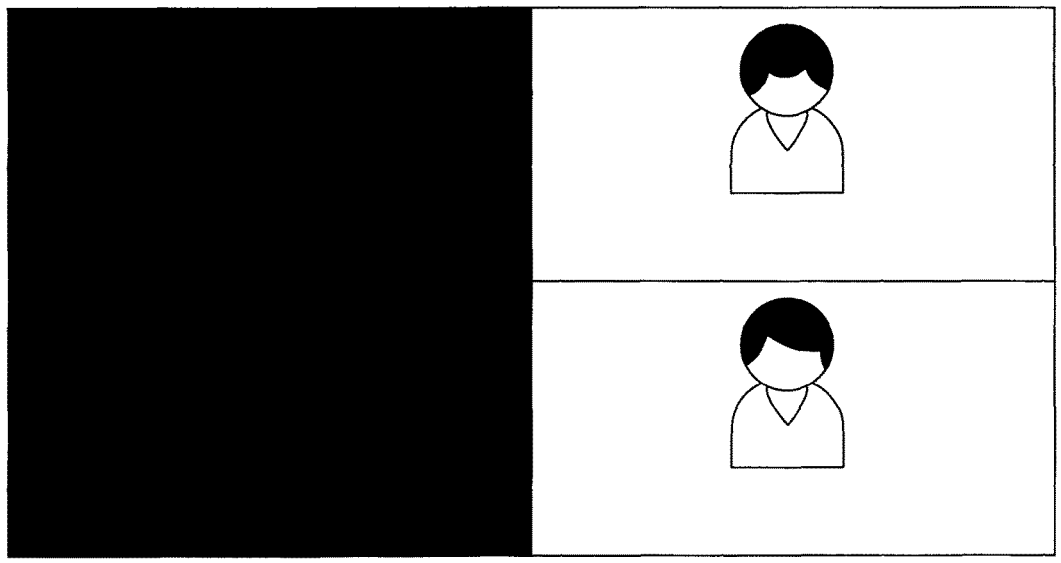
[Fig. 15F]
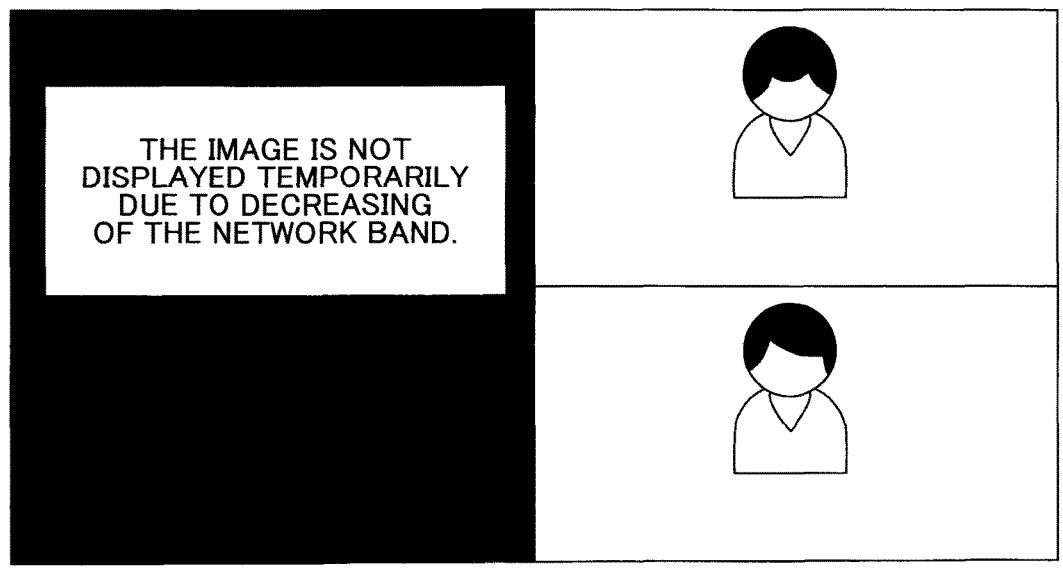

TRANSMISSION MANAGEMENT SYSTEM, COMMUNICATION METHOD, AND NON-TRANSITORY RECORDING MEDIUM

TECHNICAL FIELD

The present invention relates to a transmission management system, a communication method, and a non-transitory recording medium for causing a computer to execute a process.

BACKGROUND ART

A video conference system for performing a video conference (may be referred to as "the TV conference") with a remote location in order to meet requests for reducing expenses and times for a business trip is popularized. In the video conference system, conversations (communications) are performed by transmitting/receiving image data and sound data (audio data) directly between a plurality of video conference terminals.

Recently, a video conference system which performs transmitting/receiving the image data and the sound data between a plurality of video conference terminals via a relay apparatus which relays the image data and the sound data has been spread in the art. The above described video conference system, in which the relay apparatus relays the image data and the sound data, uses an image coding technique for minimizing failure of communication even if temporary failure of a network occurs or a processing capability of the video conference terminal is low. Further, the image coding technique uses a standard called as H.264/SVC (Scalable Video Coding) (refer to Patent document 1).

However, under a circumstance in which transmission capacity is lowered due to congestion of the communication network or the like, a reception of the image data may be delayed at a reception side video conference terminal. Patent document 1 discloses a technique which stops transmitting/receiving the image data and performs transmitting/receiving only the sound data in order to continue communicating. Thereby, an image with strangeness which shows an object of a communication partner side (an opposite side) due to a long delay is not displayed at the reception side (in this case, own side) video conference terminal of the image data.

However, when a user at the communication partner side stops talking in a state in which the image which shows the object of the communication partner side is not displayed at the own side, not only the image but also the sound is not output at the own side. Thus, the user (oneself) at the own side cannot recognize a reason why the image of the communication partner side (the figure of the communication partner or the like) is not displayed. That is, the user cannot recognize whether the user at the communication partner side stops communicating or the image data is not transmitted because the bandwidth of the communication is narrow.

SUMMARY OF INVENTION

An embodiment of the present invention discloses a transmission management system for managing a first transmission terminal and a second transmission terminal, the first transmission terminal and the second transmission terminal communicating with each other via a relay apparatus which relays image data. The transmission management system includes a reception unit configured to receive, from the first transmission terminal, band information which indicates whether a bandwidth of communication between the relay apparatus and the first transmission terminal is equal to or narrower than a predetermined value, and a transmission unit configured to transmit, to the first transmission terminal, a message which indicates that image data transmitted from the second transmission terminal is hidden because the bandwidth is narrow, in response to an event in which the reception unit receives the band information which indicates that the bandwidth is equal to or narrower than the predetermined value.

Another embodiment of the present invention discloses a communication method executed by a transmission management system for managing a first transmission terminal and a second transmission terminal, the first transmission terminal and the second transmission terminal communicating with each other via a relay apparatus which relays image data, the transmission management system including a storage unit configured to store a message which indicates that image data transmitted from the second transmission terminal is hidden because a bandwidth is narrow, the communication method including a step of receiving, from the first transmission terminal, band information which indicates whether the bandwidth of communication between the relay apparatus and the first transmission terminal is equal to or narrower than a predetermined value, a step of reading out the message from the storage unit in response to an event in which the band information which indicates that the bandwidth is equal to or narrower than the predetermined value is received in the step of receiving, and a step of transmitting the message, which is read out, to the first transmission terminal.

According to the embodiment of the present invention, a message which indicates that image data transmitted from the second transmission terminal is hidden because the bandwidth is equal to or narrower than a predetermined value is transmitted to the first transmission terminal. Thus, it is possible to recognize a reason why an image of a communication partner side, which is the second transmission terminal side, is not displayed. That is, a user of the first transmission terminal may recognize whether a user of the communication partner side stops communicating or the image data is not transmitted because the bandwidth of the communication is narrow.

BRIEF DESCRIPTION OF DRAWINGS

FIG. 1 is a schematic diagram illustrating a communication part of a video conference of a transmission system according to an embodiment.

FIG. 2 is an external view illustrating a transmission terminal according to the embodiment.

FIG. 3 is a diagram illustrating a hardware configuration of the transmission terminal according to the embodiment.

FIG. 4 is a diagram illustrating a hardware configuration of a transmission management system according to the embodiment.

FIG. 5 is a drawing illustrating the entire configuration of the transmission system according to the embodiment.

FIG. 6 is a functional block diagram illustrating the transmission system according to the embodiment.

FIG. 7A is a schematic diagram illustrating an arrangement management table.

FIG. 7B is a schematic diagram illustrating an arrangement area.

FIG. 8A is a schematic diagram illustrating an arrangement management table.

FIG. 8B is a schematic diagram illustrating an arrangement area.

FIG. 9 is a schematic diagram illustrating an authentication management table.

FIG. 10 is a schematic diagram illustrating a terminal management table.

FIG. 11 is a schematic diagram illustrating a destination list management table.

FIG. 12 is a sequence chart illustrating a process of a case in which the transmission terminal logs in.

FIG. 13 is a sequence chart illustrating a process for displaying additional displaying data.

FIG. 14 is a flowchart illustrating a process for reading out the additional displaying data.

FIG. 15A is a diagram illustrating a screen example of the transmission terminal.

FIG. 15B is a diagram illustrating a screen example of the transmission terminal.

FIG. 15C is a diagram illustrating a screen example of the transmission terminal.

FIG. 15D is a diagram illustrating a screen example of the transmission terminal.

FIG. 15E is a diagram illustrating a screen example of the transmission terminal.

FIG. 15F is a diagram illustrating a screen example of the transmission terminal.

DESCRIPTION OF EMBODIMENTS

First Embodiment

In the following, an embodiment of the present invention will be described with reference to the accompanying drawings.

<Entire Configuration for a Video Conference>

First, a transmission system 1 for performing the video conference between a plurality of transmission terminals 10*aa* and 10*db* will be described. FIG. 1 is a schematic diagram illustrating a communication part of the video conference of the transmission system 1 according to an embodiment.

The transmission system 1, shown in FIG. 1, includes the transmission terminals 10*aa* and 10*db*, a relay apparatus 30, and a transmission management system 50. In the following, an arbitrary transmission terminal of the transmission terminals 10*aa*, 10*db* and the like is referred to as "the transmission terminal 10".

The transmission terminal 10 performs communicating by transmitting/receiving image data and sound data as examples of content data. The image of the image data may be a still image or a video image. The image of the image data may include both the still image and the video image.

In the following description, the transmission terminal as a request source which requests the start of the video conference is referred to as "the request source terminal", and the transmission terminal as a destination (a relay destination) of the request is referred to as "the destination terminal". In FIG. 1, the transmission terminal 10*aa* is shown as the request source terminal, and the transmission terminal 10*db* is shown as the destination terminal. However, in a case in which the transmission terminal 10*db* requests to start the video conference, the transmission terminal 10*db* is the request source terminal and the transmission terminal 10*aa* is the destination terminal. Meanwhile, the transmission terminals 10 may be used not only for communicating (calling) between different offices or between different rooms in a same office but also for communicating in a same room, between indoor and outdoor, or between outdoor and outdoor. In a case in which each of the transmission terminals 10 is used outdoors, a wireless communication such as a cellular phone communication network may be performed.

The relay apparatus 30 performs a process for relaying the content data between the transmission terminals 10. The transmission management system 50 manages login authentication of the transmission terminals 10, communication status of the transmission terminals 10, the destination lists, communication status of the relay apparatus 30 and the like in an integrated fashion.

In the transmission system 1, a management information session sei for transmitting/receiving various kinds of management information is established between the request source terminal and the destination terminal via the transmission management system 50. Further, four sessions are established between the request source terminal and the destination terminal via the relay apparatus 30 for transmitting/receiving four data including high resolution image data, medium resolution image data, low resolution image data, and sound data. In FIG. 1, these four sessions are collectively indicated as image-sound session sed. Meanwhile, the image-sound data session sed is not limited to four sessions. The number of sessions of the image-sound data session sed may be more than four or less than four.

In the following, the resolution of the image of the image data handled by the embodiment will be described. For example, the low resolution image as a base image may be data of which horizontal size is 160 pixels and vertical size is 120 pixels. The medium resolution image data may be data of which horizontal size is 320 pixels and vertical size is 240 pixels. The high resolution image data may be data of which horizontal size is 640 pixels and vertical size is 480 pixels. When transmitted via a narrow bandwidth path, low quality image data made of only the low resolution image data, serving as the base image, are relayed. When the bandwidth is relatively wide, medium quality image data made of the medium resolution image data and the low resolution image data serving as the base image are relayed. When the bandwidth is extremely wide, high quality image data made of the low resolution image data serving as the base image quality, the medium resolution image data, and the high resolution image data are relayed. The sound data may be relayed via the narrow bandwidth path because data amount of the sound data is small in comparison with the image data.

The transmission system 1 may include a data provisioning system, in which the content data are transmitted unidirectionally via the transmission management system 50 from one of the transmission terminals 10 to the other of the transmission terminals 10, and a communication system, in which information, emotion or the like is communicated bidirectionally via the transmission management system 50 among the transmission terminals 10. The communication system is a system which communicates information, emotion or the like bidirectionally via a communication management system (corresponding to "the transmission management system") among a plurality of communication terminals (corresponding to "the transmission terminals"). The communication system may be the video conference system, a video telephone system or the like.

In the following description of the embodiment, the video conference system is assumed to be an example of the communication system. The video conference management system is assumed to be an example of the communication management system. The video conference terminal is assumed to be an example of the communication terminal. With the above assumptions, the transmission system, the transmission management system and the transmission terminal will be described. That is, the transmission terminal and the transmission management system according to the embodiment may be applied not only to the video conference system, but also to the communication system or to the transmission system.

<Hardware Configuration>

In the following, the hardware configuration of the embodiment will be described. FIG. 2 is an external view illustrating the transmission terminal 10 according to the present embodiment. As shown in FIG. 2, the transmission terminal 10 includes a chassis 1100, an arm 1200 and a camera housing 1300. On a front side wall surface 1110 of the chassis 1100, an intake surface (not shown) in which a plurality of intake holes are formed is provided. On a rear side wall surface 1120 of the chassis 1100, an exhaust surface 1121 in which a plurality of exhaust holes are formed is provided. According to the above configuration, by driving a cooling fan embedded in the chassis 1100, outside air behind the transmission terminal 10 can be taken in via the intake surface (not shown) and exhausted backward via the exhaust surface 1121. On a right side wall surface 1130 of the chassis 1100, a sound pickup hole 1131 is formed, and sound such as voice sound, noise, beating or the like can be picked up by a built-in microphone 114, which will be described later.

On the side of the right side wall surface 1130 of the chassis 1100, an operation panel 1150 is formed. The operation panel 1150 is provided with a plurality of operation buttons (108a to 108e), which will be described later, a power switch 109, which will be described later, and an alarm lamp 119, which will be described later. On the operation panel 1150, a sound output surface 1151, which includes a plurality of sound output holes formed for passing output sound from a built-in speaker 115, which will be described later, is formed. Moreover, on the side of the left side wall surface 1140 of the chassis 1100, a storage part 1160 for storing the arm 1200 and the camera housing 1300 is formed as a recessed part. On the right side wall surface 1130 of the chassis 1100, a plurality of connection ports (1132a to 1132c) for connecting electrically a cable to an external device connection I/F 118, which will be described later, are provided. On the other hand, on a left side wall surface 1140 of the chassis 1100, a connection port (not shown) for connecting electrically a cable 120c for the display 120 to the external device connection I/F 118 is provided.

In the following, in a case of indicating an arbitrary operation button of operation buttons (108a to 108e), "the operation button 108" is used for description, and in a case of indicating an arbitrary connection port of the plurality of connection ports (1132a to 1132c), "the connection port 1132" is used for description.

Next, the arm 1200 is mounted on the chassis 1100 via a torque hinge 1210. The arm 1200 is configured such that the arm 1200 is rotatable vertically where a tilt angle θ1 with respect to the chassis 1100 is within a range of 135 degrees. FIG. 2 illustrates the state where the tilt angle θ1 (theta1) is 90 degrees. The camera housing 1300 is provided with a built-in camera 112, which images a user, a paper document, a room and the like. Moreover, a torque hinge 1310 is formed on the camera housing 1300. The camera housing 1300 is attached to the arm 1200 via the torque hinge 1310. The camera housing 1300 is configured so that the camera housing 1300 is rotatable vertically and horizontally where a pan angle θ2 (theta2) with respect to the arm 1200 is within a range of ±180 degrees (FIG. 2 shows the state of 0 degrees), and a tilt angle θ3 (theta3) is within a range of ±45 degrees.

The external appearance diagram shown in FIG. 2 is an example, thus, the present invention is not limited to this. The camera and the microphone are not limited to built-in structures. The camera and the microphone may be external structures. Further, descriptions of the external appearance of the transmission management system 50 may be omitted as appropriate because the external appearance of the transmission management system 50 is similar to an external appearance of a typical server computer.

FIG. 3 is a diagram illustrating a hardware configuration of the transmission terminal 10 according to the embodiment. As shown in FIG. 3, the transmission terminal 10 includes a CPU (central processing unit) 101, which controls entire operations of the transmission terminal 10, a ROM (read only memory) 102, which stores the program used for driving the CPU 101 such as an IPL (initial program loader), a RAM (random access memory) 103, used as a work area for the CPU 101, a flash memory 104, storing various data, such as image data and sound data, a SSD (solid state drive) 105, which controls reading the various data from the flash memory 104 and writing the various data to the flash memory 104 according to the control by the CPU 101, a media I/F 107, which controls reading data from a recording medium (media) 106 and writing (storing) data to the recording medium 106, such as a flash memory, the operation button 108, which is operated when switching a destination of the transmission terminal 10, or the like, a power switch 109, used for turning on or off the transmission terminal 10, and a network OF (interface) 111 for transmitting data using the communication network 2. A HDD may be used instead of the SSD.

Moreover, the transmission terminal 10 further includes the built-in camera 112 for acquiring image data by taking a picture of (imaging) an object according to control by the CPU 101, an image element I/F 113, which controls the driving of the camera 112, the built-in microphone 114 for inputting voice (sound), a speaker 115 for outputting the voice, a sound input/output I/F 116, which performs a inputting/outputting process of a voice signal between the microphone 114 and the speaker 115 according to the control by the CPU 101, a display I/F 117, which transmits image data to an external display unit 120 according to the control by the CPU 101, an external device connection I/F 118, for connecting various external devices, and a bus line 110, such as an address bus or a data bus, which electrically connects the above components, as shown in FIG. 3.

The display unit 120 may be an example of a display means, formed of liquid crystal or organic EL (electro luminescence) material, which displays an image of the object or an icon image for operation or the like. The display unit 120 is connected to the display I/F 117 via the cable 120c. The cable 120c may be a cable for an analogue RGB (VGA) signal, a component video cable, or a cable for HDMI (High-Definition Multimedia Interface) (trademark registered) or for a DVI (Digital Video Interactive) signal.

The camera 112 includes a lens and a solid-state image element, which converts light into an electric signal to obtain digital data for an image (video) of an object. For the solid-state image element, for example, a CMOS (complementary metal oxide semiconductor), a CCD (charge coupled device), or the like is used.

External devices such as an external camera, an external microphone or an external speaker may be connected to the external device connection I/F 118 respectively by a USB (Universal Serial Bus) cable or the like. In a case in which the external camera is connected, with priority over the built-in camera 112, the external camera is activated according to the control by the CPU 101. Similarly, in a case in which the external microphone is connected or the external speaker is connected, with priority over the built-in microphone 114 or the built-in speaker 115, respectively, the external microphone or the external speaker is activated according to the control by the CPU 101.

The recording medium 106 is attachable and detachable with respect to the transmission terminal 10. If the recording medium 106 is a non-volatile memory, from which data are read, or into which data are written according to the control by the CPU 101, not only the flash memory 104, but also EEPROM (electrically erasable and programmable ROM) or the like may be used.

Moreover, a program for the above described transmission system may be stored in a recording medium such as the recording medium 106 or the like readable by a computer, and distributed as a file in an installable form or in an executable form. The above described transmission program may be stored in the ROM 102 other than the flash memory 104.

FIG. 4 is a diagram illustrating a hardware configuration of the transmission management system 50 according to the embodiment.

The transmission management system 50 includes a CPU 201, which controls the entire operation of the transmission management system 50, a ROM 202, which stores a program used for a driving of the CPU 201 such as an IPL (initial program leader), a RAM 203, used as a work area for the CPU 201, a HD (hard disk) 204, which stores various data such as the transmission management program, a HDD (hard disk drive) 205, which controls reading various data from the HD 204 and writing various data to the HD 204 according to control by the CPU 201, a media I/F 207, which controls reading data from a recording medium (media) 206 and writing (storing) data to the recording medium 206, such as a flash memory, a display unit 208 for displaying various information items, such as a cursor, a menu, a window, a character or an image, a network I/F 209 for transmitting data using the communication network 2, a keyboard 211 equipped with a plurality of keys for inputting characters, numerical values, various instructions or the like, a mouse 212 for performing selection and execution of various instructions, selection of a processing object, a cursor movement, or the like, a CD-ROM drive 214, which controls reading various data from a CD-ROM (compact disc read only memory) 213 and writing various data to the CD-ROM 213, as an example of a detachable recording medium, and a bus line 210, such as an address bus or a data bus, which electrically connects the above components, as shown in FIG. 4.

A program for the above described transmission management system may be stored in a recording medium such as the recording medium 206, the CD-ROM 213 or the like readable by a computer, and distributed as a file in an installable form or in an executable form. The above described transmission management program may be stored in the ROM 202 other than the HD 204.

As another example of detachable recording media, a computer readable recording medium such as CD-R (Compact Disc Recordable), DVD (Digital Versatile Disk), or Blu-ray Disc (registered trademark), or the like may be provided.

Because the relay apparatus 30 has the same hardware configuration as the transmission management system 50, a description thereof will be omitted. However, in the relay apparatus 30, the HD 204 stores a relay program.

<Entire Configuration of the Transmission System>

In the following, the entire configuration of the transmission system 1 will be described with reference to FIG. 5. FIG. 5 is a drawing illustrating the entire configuration of the transmission system 1 according to the embodiment.

As shown in FIG. 5, the request source terminal (the transmission terminal 10aa), the destination terminal (the transmission terminal 10db), the relay apparatus 30 and the transmission management system 50 are connected to the communication network 2, which includes the Internet. A communication via the communication network 2 may include wireless communication. The transmission terminal 10aa is used by a user C1, and the transmission terminal 10db is used by a user C2. The transmission management system 50 provides various services to each of the transmission terminals 10.

<Functional Configuration of the Embodiment>

In the following, the functional configuration of the embodiment will be described with reference to FIG. 3, FIG. 4, and FIG. 6. FIG. 6 is a functional block diagram illustrating the transmission system 1 according to the embodiment.

<Functional Configuration of Transmission Terminal>

The transmission terminal 10 includes a transmission/reception unit 11, a receiving unit 12, a communication control unit 13, a display control unit 17, and a storage/readout process unit 19. Each of the above units is a function or a functioning means realized by one of the components, shown in FIG. 3, operating according to an instruction from the CPU 101 following the transmission program held in the RAM 103 from the flash memory 104. Moreover, the terminal 10 includes the RAM 103 shown in FIG. 3 and a storage unit 1000 configured with the flash memory 104 shown in FIG. 3. A recording medium 1010 configured with the recording medium 106 shown in FIG. 3 is inserted in to the transmission terminal 10, and the storage/readout process unit 19 performs reading out or the writing various data.

(Arrangement Management Table)

FIG. 7A is a schematic diagram illustrating an arrangement management table, and FIG. 7B is a schematic diagram illustrating an arrangement area. Similarly, FIG. 8A is a schematic diagram illustrating an arrangement management table, and FIG. 8B is a schematic diagram illustrating an arrangement area.

The storage unit 1000 includes an arrangement management DB (Data Base) 1001 configured with the arrangement management table shown in FIG. 7A. In the arrangement management table, a screen area number for specifying an area displayed in the screen of the display unit 120, the terminal ID of the transmission terminal, and the destination name (terminal name) are associated with each other and managed. For example, because a state in which the screen is divided into two areas in FIG. 7A is managed, two areas (the area 1 and the area 2) are displayed in the display unit 120 as shown in FIG. 7B. The destination name (terminal name) which indicates "DB terminal London Office Europe" is displayed in the area 1 in FIG. 7B, and the destination name which indicates "AA terminal Tokyo Office Japan" is displayed in the area 2 in FIG. 7B.

For example, when the user changes the arrangement of the screen area, the arrangement management table is changed dynamically as shown in FIG. 8A. In FIG. 8A, the screen is divided into three areas. In accordance with that, three areas (the area 1, the area 2, and the area 3) are displayed in the display unit 120 as shown in FIG. 8B.

<Functional Configurations of Transmission Terminals>

Next, the functional configuration of each of the transmission terminals 10 will be described in detail with reference to FIG. 3 and FIG. 6. In the description below, when the functional configuration of each of the transmission terminals 10 is described, the relationship with main configuration elements for achieving the functional configuration of the transmission terminal 10 among the configuration elements shown in FIG. 3 will also be described.

The transmission/reception unit 11 of the transmission terminal 10 shown in FIG. 6 is realized by the instruction from the CPU 101 shown in FIG. 3 and the network I/F 111 shown in FIG. 3, and transmits various data (or information) to another transmission terminal, apparatus or system and receives the various data from the other transmission terminal, apparatus or system via the communication network 2. The transmission/reception unit 11 starts receiving, from the transmission management system 50, status information items, each of which indicates status of each of the transmission terminals 10, serving as the destination candidates, before starting communication with intended destination terminal. The status information may indicate not only operational status (online status or offline status) of each of the transmission terminals 10 but also detailed status about whether the transmission terminal 10 is communicable (capable of communicating), the transmission terminal 10 is communicating, or the user is leaving. Further, the status information may indicate not only operational status of each of the transmission terminals 10 but also status in which the cable 120c is removed from the transmission terminal 10, status in which the sound is output but the image is not output, and status in which the sound is not output (MUTE). In the following, a case in which the status information indicates the operational status will be described as an example.

The receiving unit 12 is realized by the instruction from the CPU 101, the operation button 108 and the power switch 109, shown in FIG. 3, and receives various inputs from a user. For example, in response to an event in which the user turns the power switch 109, shown in FIG. 3, ON, the receiving unit 12 receives a signal of the user's operation, and turns ON the power.

The communication control unit 13 is realized by the instruction from the CPU 101, the camera 112 and the image element I/F 113, shown in FIG. 3. The communication control unit 13 takes a picture of (imaging) an object and outputs image data obtained by taking the picture. The communication control unit 13 is realized by the instruction from the CPU 101 and the sound (voice) input/output I/F 116, shown in FIG. 3, and after the microphone 114 converts a user's sound (voice) into a sound signal, the communication control unit 13 outputs sound data regarding the sound signal. Moreover, the communication control unit 13 is realized by the instruction from the CPU 101 and the sound input/output I/F 116, shown in FIG. 3, and outputs the sound data regarding the sound signal to the speaker 115 in order to cause the speaker 115 to output the sound.

The display control unit 17 is realized by the instruction from the CPU 101 and the display I/F 117, shown in FIG. 3. The display control unit 17 combines received image data whose resolutions are different from each other and performs control for transmitting the combined image data to the display unit 120. The display control unit 17 may transmit information of the destination list, which is received from the transmission management system 50, to the display unit 120 in order to display the destination list on the display unit 120. The display control unit 17 adds additional displaying data as a message, which will be described later, or as a destination name (terminal name) on the image data.

The storage/readout process unit 19 is executed by the instruction from the CPU 101 and the SSD 105, shown in FIG. 3 or realized by the instruction from the CPU 101. The storage/readout process unit 19 stores various data into the storage unit 1000 or the recording medium 1010, and performs a process for reading out the various data stored in the storage unit 1000 or the recording medium 1010. The storage unit 1000 stores a terminal ID (Identification) for identifying the transmission terminal 10, and the like. Moreover, the storage unit 1000 is overwritten and stored every time the image data and the sound data are received when communicating with the destination terminal. The image of the image data before being overwritten is displayed on the display unit 120, and the sound of the sound data before being overwritten is output from the speaker 150.

It should be noted that the terminal ID according to the embodiment indicates an example of identification information, such as a language, a character, a symbol, various kinds of signs or the like, used for uniquely identifying the transmission terminal 10. The terminal ID may be identification information which is a combination of at least two of the language, the character, the symbol, or the various kinds of signs. Moreover, a user ID may be used for identifying the user of the transmission terminal 10 instead of the terminal ID. In this case, the terminal identification information may include not only the terminal ID but also the user ID.

<Functional Configuration of Relay Apparatus>

The relay apparatus 30 includes a transmission/reception unit 31 which doubles as a transfer unit, a determination unit 32, and a storage/readout process unit 39. Each of the above units is a function or a function means realized by one of the configuration elements, shown in FIG. 4, operating according to an instruction from the CPU 201 following the relay program held in the RAM 203 from the HD 204. Moreover, the relay apparatus 30 includes at least one of the RAM 203 shown in FIG. 4 and a storage unit 3000 shown in FIG. 6 configured with the HD 204.

<Each of Functional Configurations of the Relay Apparatus>

Next, each of the functional configurations of the relay apparatus 30 will be described in detail. In the description below, when each of functional configurations of the relay apparatus 30 is described, the relationship with main configuration elements for achieving the functional configurations of the relay apparatus 30 among the configuration elements shown in FIG. 4 will also be described.

The transmission/reception unit 31 of the relay apparatus 30, shown in FIG. 6, is realized by the instruction from the CPU 201 and the network I/F 209, shown in FIG. 4. The transmission/reception unit 31 transmits various data (or information) to other transmission terminals 10, other relay apparatuses 30 or other systems, and receives the various data from the other transmission terminals 10, the other relay apparatuses 30 or the other systems, via the communication network 2. Moreover, the transmission/reception unit 31 also functions as a transfer unit and transfers the image data and the sound data transmitted from a first transmission terminal to a second transmission terminal.

The determination unit 32 determines whether an image is a black image or a normal image based on a data volume of the content data transmitted from the transmission terminal 10. The black image is a whole black image which does not show the current object of the communication partner side (opposite side). The data volume of the black image is smaller than the data volume of the image which shows the object. It should be noted that unless the object is not shown (hidden), a white image or a color image (a red image, a blue image or the like) may be used instead of the black image. Further, a predetermined specific shape image may be shown stationarily.

The storage/readout process unit 39 is realized by the instruction from the CPU 201 and the HDD 205, shown in FIG. 4. The storage/readout process unit 39 stores various data into the storage unit 3000, and reads out the various data stored in the storage unit 3000.

<Functional Configuration of Transmission Management System>

The transmission management system 50 includes a transmission/reception unit 51, a determination unit 52, and a storage/readout process unit 59. Each of the above units is a function or a functioning means realized by one of the configuration elements, shown in FIG. 6, operating according to an instruction from the CPU 201 following the transmission management program held in the RAM 203 from the HD 204. Moreover, the transmission management system 50 includes a storage unit 5000, configured with the HD 204, shown in FIG. 4. For example, as shown in FIG. 15C, the storage unit 5000 stores a message which indicates that image data from a communication partner is not displayed because the bandwidth of the communication is narrow. As shown in FIG. 15C the message is "the image is not displayed temporarily due to decreasing of the network band".

(Authentication Management Table)

The storage unit 5000 includes an authentication management DB 5001, including an authentication managing table, as shown in FIG. 9. FIG. 9 is a schematic diagram illustrating an authentication management table. In the authentication management table, each of terminal IDs of all the transmission terminals 10 managed by the transmission management system 50 is associated with its password and managed. For example, the authentication management table shown in FIG. 9 indicates that a terminal ID of the transmission terminal 10aa (see FIG. 1) is "01aa" and a password of the transmission terminal 10aa is "aaaa".

(Terminal Management Table)

The storage unit 5000 includes a terminal management DB 5002, including a terminal management table, as shown in FIG. 10. FIG. 10 is a schematic diagram illustrating a terminal management table. In the terminal management table, a destination name (terminal name) of the transmission terminal 10 when each of the transmission terminals is set as a destination, an operational status of the transmission terminal 10, a reception time (year, date, and hour) when the transmission management system 50 receives login request information, which will be described later, and an IP address of the transmission terminal 10 are associated with each of terminal IDs of the transmission terminals 10 and managed. For example, in the terminal management table shown in FIG. 10, the transmission terminal 10aa with the terminal ID "01aa" indicates that the destination name (terminal name) is "AA terminal Tokyo Office Japan", the operational status is "online (communicable)", the transmission management system 50 receives the login request information at "Apr. 10, 2014, 13:40" and the IP address of the transmission terminal 10aa is "1.2.1.3". It should be noted that "communicable" indicates "able to communicate".

(Destination List Management Table)

The storage unit 5000 includes a destination list management DB 5003 configured with a destination list management table, as shown in FIG. 11. FIG. 11 is a schematic diagram illustrating a destination list management table. In the destination list management table, all terminal IDs of destination terminals registered as candidates of destination terminals are managed in association with the request source terminals which request starting communication. For example, the destination list management table shown in FIG. 11 indicates that candidates of the destination terminals, with which the request source terminal (the transmission terminal 10aa) with the terminal ID "01aa" can request to start communication, are the transmission terminal 10ab with the terminal ID "01ab", the transmission terminal 10ba with the terminal ID "01ba", the transmission terminal 10bb with the terminal ID "01bb" and the like. The candidates of the destination terminal may be updated by appending or deleting an item in the destination list management table according to a request from the arbitrary request source terminal to the management system 50.

<Process or Operation of the Embodiment>

Next, a process method in the transmission system 1 according to the embodiment will be described with reference to FIGS. 12 to 15. In the following, an example screen displayed on the transmission terminal 10aa side in a case in which the transmission terminal 10db selects a screen mute while the transmission terminal 10aa and the transmission terminal 10db are communicating with each other will be described.

First, a process of a case in which the transmission terminal 10aa logs in will be described with reference to FIG. 12. FIG. 12 is a sequence chart illustrating a process of a case in which the transmission terminal 10aa logs in. It should be noted that, in FIG. 12, various kinds of management information are transmitted and received by the management information session sei shown in FIG. 1.

At first, when the user of the request source terminal (terminal 10aa) turns on the power switch 109, shown in FIG. 3, the receiving unit 12, shown in FIG. 6, receives the user's operation, and turns the power on (step S21). Next, in response to receiving the above-described operation for turning on the power, the transmission/reception unit 11 automatically transmits login request information, which indicates a login request, to the transmission management system 50 via the communication network 2 (step S22). It should be noted that the login request information may be transmitted in response to an operation of the operation button 108 by the user instead of responding to the operation of the power switch 109. The login request information includes the terminal ID for identifying the terminal 10aa as the request source terminal and the password. The terminal ID and the password may be data which have been read out from the storage unit 1000 via the storage/readout process unit 19 and have been transmitted to the transmission/reception unit 11. The terminal ID and the password may be stored in the recording medium 1010 and read out from the recording medium 1010. Moreover, when the login request information is transmitted from the transmission terminal 10aa to the transmission management system 50, the transmission management system 50, which is on the reception side, can obtain the IP address of the transmission terminal 10ab, which is on the transmission side.

Next, the storage/readout process unit 59 of the transmission management system 50 searches the authentication management table (See FIG. 9) with the terminal ID and the password as a search key included in the login request information received via the transmission/reception unit 51, and the determination unit 52 determines whether the same terminal ID and the password are managed in the terminal authentication table, thereby terminal authentication is performed (step S23). In a case in which it is determined that the login request information is from the transmission terminal 10 which has authorization for use by performing the terminal authentication because the same terminal ID and the same password are managed in the terminal authentication table, the storage/readout process unit 59 stores the terminal ID of the transmission terminal 10aa, an operational status, a reception time when the login request information is received, and the IP address of the transmission terminal 10aa in the terminal management table (See FIG. 10) in association with each other (step S24). Accordingly, the operational status "online (communicable)", the reception time "2014.4.10.13:40", and the IP address of the terminal 10aa "1.2.1.3" are associated with the terminal ID "01aa" and managed in the terminal management table shown in FIG. 10.

Then, the transmission/reception unit 51 of the transmission management system 50 transmits authentication result information, which indicates a result of the terminal authentication, via the communication network 2, to the request source terminal (the terminal 10aa), which has required the login (step S25). In the following, a case in which it is determined that the request source terminal has authorization for use will be described.

The storage/readout process unit 59 of the transmission management system 50 extracts the terminal ID of a candidate of a destination terminal by searching the destination list management table (see FIG. 11) with the terminal ID "01aa" of the request source terminal (the transmission terminal 10aa), which has required the login, as a search key, and reading out the terminal ID of the candidate of the destination terminal, which can communicate with the request source terminal (the transmission terminal 10aa), from the destination list management table (step S26). In the following, for simplifying the description, a case in which three transmission terminals, which are the transmission terminal 10ab, 10ba and 10db, are extracted as the candidates of the destination of the request source terminal (the transmission terminal 10aa) will be described.

Next, the storage/readout process unit 59 obtains operational status of each of the transmission terminals 10ab, 10ba and 10db by searching the terminal management table (see FIG. 10) with the extracted terminal IDs ("01ba, 01db") of the candidates of the destination terminal as a search key, and reading out operational statuses ("offline", "online", "online") for each of the extracted terminal IDs (step S27).

Next, the transmission/reception unit 51 transmits destination status information to the request source terminal (the transmission terminal 10aa) via the communication network 2 (step S28). The destination status information include the terminal IDs ("01ab", "01ba" and "01db") used as the search key in step S27 and the operational statuses ("offline", "online (communicable)" and "online (communicable)") of the corresponding destination terminals (the transmission terminals 10ab, 10ba, and 10db). Accordingly, the request source terminal (the transmission terminal 10aa) can obtain the operational statuses ("offline", "online (communicable)" and "online (communicable)") at present of each of the transmission terminals (10ab, 10ba and 10db) as the candidates of the destination terminal, which can communicate with the request source terminal (the transmission terminal 10aa).

Furthermore, the storage/readout process unit 59 of the transmission management system 50 searches the destination list management table (see FIG. 11) with the terminal ID "01aa" of the request source terminal (the transmission terminal 10aa), which has required the login, as a search key, and extracts terminal IDs of other request source terminals, each of which registers the terminal ID "01aa" of the above-described request source terminal (the transmission terminal 10aa) as a candidate of a destination terminal (step S29). In the destination list management table, the extracted terminal IDs of the other request source terminals are "01ba" and "01db".

Next, the storage/readout process unit 59 of the transmission management system 50 searches the terminal management table (see FIG. 10) with the terminal ID "01aa" of the request source terminal (the transmission terminal 10aa), which has required the login, as a search key, and obtains the operational status of the request source terminal (the transmission terminal 10aa) (step S30).

Then, the transmission/reception unit 51 transmits destination status information to the transmission terminals (10ba and 10db) whose operational statuses are "online", in the terminal management table (see FIG. 10), out of the transmission terminals (10ab, 10ba and 10db) corresponding to the terminal IDs ("01ab", "01ba" and "01db"), extracted in step S29 (steps S31-1 and S31-2). The destination status information includes the terminal ID "01aa" of the request source terminal (the transmission terminal 10aa) obtained in step S30 and the operational status of "online". Meanwhile, the transmission/reception unit 51 refers to the IP addresses of the transmission terminals managed in the terminal management table based on each of the terminal IDs ("01ba" and "01db") when the transmission/reception unit 51 transmits the destination status information to the transmission terminals 10ba and 10db. Accordingly, the transmission/reception unit 51 can notify each of the other destination terminals (the transmission terminals 10ba and 10db) which can communicate with the request source terminal (the transmission terminal 10aa), which has required the login, as a destination, of the terminal ID "01aa" of the request source terminal (the transmission terminal 10aa), which has required the login, and the operational status of "online".

On the other hand, also in the other transmission terminals 10 other than the transmission terminal 10aa, when the user turns on the power switch 109 in the same way as step S21, the receiving unit 12 receives the user's operation. Because the same processes as in steps S22 to S31-1 and S31-2 are executed, a description may be omitted as appropriate.

Subsequently, a process in which the transmission terminal 10aa displays additional displaying data in a case in which the communication is performed between the transmission terminal 10aa, the transmission terminal 10ba and the transmission terminal 10db (three bases) will be described with reference to FIG. 13. FIG. 13 is a sequence diagram illustrating the process for displaying the additional displaying data. In the case in which the communication is performed between three bases, the image data and the sound data transmitted from the transmission terminal 10db are received by the transmission terminal 10aa and the transmission terminal 10ba which are communication partners via the relay apparatus 30. However, for simplifying the description, FIG. 13 shows a process in which the image data and the sound data transmitted from the transmission terminal 10db are received by the transmission terminal 10aa and the transmission terminal 10ba which are communication partners via the relay apparatus 30.

The transmission/reception unit 31 of the relay apparatus 30 transmits a Ping to each of the transmission terminals 10 and receives responses from each of the transmission terminals 10 all the time, and thereby, the determination unit 32 measures a bandwidth (the maximum communication speed) of the communication between the transmission terminals 10 in order to determine whether the bandwidth is equal to or less (narrower) than a predetermined value (step S41). For example, the predetermined value may be 10 kbps.

In the above state, first, the transmission/reception unit 11 of the destination terminal (the transmission terminal 10db) transmits the image data, the sound data, and the terminal ID of the transmission terminal 10db to the relay apparatus 30 (step S42). Accordingly, the transmission/reception unit 31 of the relay apparatus 30 receives the image data, the sound data, and the terminal ID of the transmission terminal 10db.

Subsequently, the determination unit 32 of the relay apparatus 30 determines whether an image is the black image or the normal image based on the data volume of the image data received in step S42 (step S43). In a case in which the destination terminal (the transmission terminal 10db) mutes the image, the destination terminal (the transmission terminal 10db) transmits the black image data, which does not show the object, to the relay apparatus 30. The determination unit 32 may determine whether the image is the black image or the normal image based on the data volume because the data volume of the black image is smaller than the data volume of the normal image which shows the object.

Subsequently, the transmission/reception unit 31 of the relay apparatus 30 transmits image type information and band information in addition to the image data, the sound data and the terminal ID of the transmission terminal 10db received in step S42 (step S44). Accordingly, the transmission/reception unit 11 of the request source terminal (the transmission terminal 10aa) receives the image data, the sound data, the terminal ID of the transmission terminal 10db, the image type information and the band information.

At that time, in a case in which the determination unit 32 determines that the normal image data is received from the destination terminal (the transmission terminal 10db) in step S43, the image type information indicates "the normal image". Further, in a case in which the determination unit 32 determines that the black image data is received from the destination terminal (the transmission terminal 10db), the image type information indicates "the black image".

On the other hand, in a case in which the determination unit 32 determines that the bandwidth exceeds the predetermined value in step S41, the transmission/reception unit 31 transmits the image data transmitted from the destination terminal (the transmission terminal 10db) to the request source terminal (the transmission terminal 10aa) as it is. That is, in a case in which the destination terminal (the transmission terminal 10db) transmits the normal image data without muting the image, the transmission/reception unit 31 transmits the normal image data to the request source terminal (the transmission terminal 10aa). Further, in a case in which the destination terminal (the transmission terminal 10db) mutes the image and transmits the black image data, the transmission/reception unit 31 transmits the black image data to the request source terminal (the transmission terminal 10aa). In this case, the band information indicates "wide".

Further, in a case in which the determination unit 32 determines that the bandwidth is equal to or less than the predetermined value in step S41, the transmission/reception unit 31 transmits the black image data to the request source terminal (the transmission terminal 10aa) regardless of the type of the image data transmitted from the destination terminal (the transmission terminal 10db). In this case, the band information indicates "narrow".

Subsequently, at the request source terminal (the transmission terminal 10aa), when the transmission terminal 10 which participates in the conference is changed, the storage/readout process unit 39 changes the arrangement management table (step S45). For example, when the number of transmission terminals 10 which participate in the conference is increased by one, the screen which is divided into two areas as shown in FIG. 7B is changed (set) to the screen which is divided into three areas as shown in FIG. 8B. At that time, the arrangement management table is changed from the state of FIG. 7A to the state of FIG. 8A.

Subsequently, at the request source terminal (the transmission terminal 10aa), the receiving unit 12 receives a setting of whether the destination name (terminal name) is displayed or not in accordance with the operation of the operation button 108 by the user C1 (step S46). It should be noted that the setting by the user may be performed at any timing after the process in step S21 and before the process in step S46.

Subsequently, the transmission/reception unit 11 of the request source terminal (the transmission terminal 10aa) transmits a request for the additional displaying data, and the terminal ID of the destination terminal (the transmission terminal 10db) to the transmission management system 50 (step S47). Accordingly, the transmission/reception unit 51 of the transmission management system 50 receives the request for the additional displaying data, and the terminal ID of the destination terminal (the transmission terminal 10db). The request for the additional displaying data includes destination name (terminal name) displaying/hiding information which indicates whether the destination name (terminal name) is displayed or not (hidden), and the above described band information.

Subsequently, the transmission management system 50 performs a process for reading out the additional displaying data (at least one of the destination name (terminal name) and the message) (step S48). In the following, the process for reading out the additional displaying data will be described with reference to FIG. 14. FIG. 14 is a flowchart illustrating the process for reading out the additional displaying data.

As shown in FIG. 14, the determination unit 52 of the transmission management system 50 determines whether the destination name (terminal name) is displayed based on the destination name (terminal name) displaying/hiding information (step S48-1). In a case in which the determination unit 52 determines that the destination name (terminal name) is displayed (YES in step S48-1), the storage/readout process unit 39 reads out corresponding destination name (terminal name) by searching the terminal management table (see FIG. 10) with the terminal ID of the destination terminal (the transmission terminal 10db) received in the process of step S47 as a searching key (step S48-2). On the other hand, in a case in which the determination unit 52 determines that the destination name (terminal name) is not displayed (NO in step S48-1), the process goes to step S48-3 omitting the process of step S48-2.

Subsequently, the determination unit 52 determines whether the bandwidth of the communication between the relay apparatus 30 and the request source terminal (the transmission terminal 10aa) is narrow based on the band information received in step S47 (step S48-3). In a case in which the determination unit 52 does not determine that the bandwidth is narrow (NO in step S48-3), the process in step S48 ends.

On the other hand, in a case in which the determination unit 52 determines that the bandwidth is narrow (YES in step S48-3), the storage/readout process unit 39 reads out a message which indicates a fixed phrase from the storage unit 5000 (step S48-4).

Subsequently, The transmission/reception unit 51 of the transmission management system 50 transmits the additional displaying data and the terminal ID of the destination terminal (the transmission terminal 10db) to the request source terminal (the transmission terminal 10aa) (step S49). Accordingly, the transmission/reception unit 11 of the request source terminal (the transmission terminal 10aa) receives the additional displaying data and the terminal ID of the destination terminal (the transmission terminal 10db). The additional displaying data may include at least one of the destination name (terminal name) which is read out in step S48-2 and the message which is read out in step S48-4. It should be noted that the transmission/reception unit 51 may not transmit the additional displaying data.

Subsequently, at the request source terminal (the transmission terminal 10aa), the storage/readout process unit 19 updates arrangement information with respect to the arrangement management table (see FIG. 8A) (step S50). For example, in a case in which the destination terminal is only the transmission terminal 10db, in parts of the terminal ID of the destination terminal and the destination name (terminal name) of records of the area 2 in FIG. 7A, the terminal ID of the destination terminal (the transmission terminal 10db) which is transmitted from the transmission management system 50 according to the process in step S49, and the destination name (terminal name) if the destination name (terminal name) is transmitted as the additional displaying data, may be managed.

Subsequently, in a case in which the transmission/reception unit 11 of the request source terminal (the transmission terminal 10aa) has received the additional displaying data, the communication control unit 13 adds the additional displaying data to the image data transmitted from the destination terminal (transmission terminal 10db) according to above step S42 to step S44 via the relay apparatus 30 (step S51). Then, the communication control unit 13 displays the image to which the additional displaying data is added on the display unit 120 (step S52).

Although the relay apparatus 30 determines the image type based on the data volume of the image data in step S43 in the embodiment, the present invention is not limited to this. The request source terminal (the transmission terminal 10aa) may determine the image type based on the data volume of the image data. In this case, the relay apparatus 30 may not transmits the image type information in step S44.

FIGS. 15A to 15F are diagrams illustrating screen examples of the transmission terminal 10aa.

FIG. 15A is a diagram illustrating a screen example in a case in which the process in FIG. 14 proceeds "YES in step S48-1 and NO in step S48-3" and the normal image data is transmitted from the destination terminal (the transmission terminal 10db). As shown in FIG. 15A, the image of the destination terminal (the transmission terminal 10db) side is displayed in the left area (area 1) of the screen. Further, the image of the destination terminal (the transmission terminal 10ba) side is displayed in the lower right area (area 2) of the screen. Further, the image of the request source terminal (the transmission terminal 10aa) side, which is the own terminal, is displayed in the upper right area (area 3) of the screen. The destination names (terminal names) are displayed in under-parts of the respective areas. That is, FIG. 15A shows a normal displaying status. It should be noted that, in the left side area (the area 1) which is a large area with respect to the area 2 and the area 3, an office of a communication partner producing a voice sound at present, an important office of the conference or the like (various patterns) may be displayed.

FIG. 15B is a diagram illustrating a screen example in a case in which the black image is transmitted from the destination terminal (the transmission terminal 10db) by muting the image. A process of FIG. 14 in FIG. 15B is the same as the process of FIG. 14 in FIG. 15A (YES in step S48-1 and NO in step S48-3 in FIG. 14). The diagram shown in FIG. 15B differs from the diagram shown in FIG. 15A in that the black image is transmitted by muting the image. The black image is displayed in the area 1 in FIG. 15B, and the destination name (terminal name) is displayed on the black image.

FIG. 15C is a diagram illustrating a screen example in a case in which the process in FIG. 14 proceeds "YES in step S48-1 and YES in step S48-3" and the normal image is transmitted from the destination terminal (the transmission terminal 10db). The black image is displayed in the area 1 in FIG. 15C, and the destination name (terminal name) and the message are displayed on the black image.

FIG. 15D is a diagram illustrating a screen example in a case in which the process in FIG. 14 proceeds "NO in step S48-1 and NO in step S48-3" and the normal image is transmitted from the destination terminal (the transmission terminal 10db). The destination names (terminal names) are not displayed in the areas 1 to 3 in FIG. 15D.

FIG. 15E is a diagram illustrating a screen example in a case in which the black image is transmitted from the destination terminal (the transmission terminal 10db) by muting the image. A process of FIG. 14 in FIG. 15E is the same as the process of FIG. 14 in FIG. 15D (No in step S48-1 and NO in step S48-3 in FIG. 14). The diagram shown in FIG. 15E differs from the diagram shown in FIG. 15D in that the black image is transmitted by muting the image. The black image is displayed in the area 1 in FIG. 15E.

FIG. 15F is a diagram illustrating a screen example in a case in which the process in FIG. 14 proceeds "NO in step S48-1 and YES in step S48-3" and the normal image is transmitted from the destination terminal (the transmission terminal 10db). The black image is displayed in the area 1 in FIG. 15F, and the message is displayed on the black image.

<Main Effect of the Embodiment>

According to the above described embodiment, the destination name (terminal name) of the transmission terminal of the communication partner or the additional displaying data as the predetermined message is added to the black image data which is transmitted from the transmission terminal of the communication partner via the relay apparatus, and the added image is displayed. Accordingly, the user (oneself) at the own side may recognize a reason why the image of the communication partner side (the figure of the communication partner or the like) is not displayed. That is, the user may recognize whether the user at the communication partner side stops communicating or the image data is not transmitted because the bandwidth of the communication is narrow.

<Supplement to the Embodiment>

The relay apparatus 30 and the transmission management system 50 according to the above described embodiment may be structured with a single computer, or may be structured with a plurality of computers in which each of units (function or means) is divided and allocated in any manner.

A recording medium such as the CD-ROM or the like storing any one of the transmission program executed in each of the transmission terminals 10 according to the above described embodiment, the relay program executed in the relay apparatus 30, and the transmission management program executed in the transmission management system 50 may be provided in a domestic country or overseas as a program product.

Moreover, in the above-described embodiment, a case of a video conference terminal is described as an example of the transmission system 1. However, the present invention is not limited to this. The transmission system 1 may be a telephone system such as an IP (Internet Protocol) telephone, an internet telephone or the like. Moreover, the transmission system 1 may be a smartphone, a cellular phone, a car navigation terminal, a wearable computer, a monitor camera, a digital camera, which can communicate via the Wi-Fi or the like, equipment which has a communication function such as an electronic blackboard, a projector, a game machine or the like, digital signage, or industrial equipment which has a communication function. The wearable computer may be a wristwatch, a head mounted display or the like. The industrial equipment may be a MFP (Multifunction Peripheral/Printer/Product), medical equipment such as an endoscope or the like, agricultural equipment such as a cultivator or the like.

In the above description of the embodiment, the image data and the sound data (audio data) have been described as an example of the content data, however the present invention is not limited to this. Alternatively, the content data may be tactile (touch) data. In this case, the sense of being touched (felt) by the user at one of the terminals is transmitted to other terminals. Further, the content data may be smell data. In this case, smell at one of the terminals is transmitted to other terminals. Further, the content data may be at least one of the image data, the sound data, tactile data, and the smell data.

In the above embodiment, the case where the video conference is conducted by the transmission system 1 has been described, but the present invention is not limited to this. Alternatively, the transmission system 1 may be used for meetings, conversations between family members or between friends, or one-way presentations of information.

Further, the present invention is not limited to the above described embodiment, but various variations and modifications may be made without departing from the scope of the present invention.

The present application is based on and claims the benefit of priority of Japanese Priority Application No. 2015-010604 filed on Jan. 22, 2015, the entire contents of which are hereby incorporated by reference.

REFERENCE SIGNS LIST

1 Transmission system,
10 Transmission terminal,
11 Transmission/reception unit,
12 Receiving unit,
13 Communication control unit,
17 Display control unit,
19 Storage/readout process unit,
30 Relay apparatus,
50 Transmission management system,
51 Transmission/reception unit (an example of a reception means, an example of a transmission means),
52 Determination unit (an example of a determination means),
59 Storage/readout process unit (an example of a read out means),
1000 Storage unit,
1001 Arrangement management DB,
3000 Storage unit,
5000 Storage unit (an example of a storage means),
5001 Authentication management DB,
5002 Terminal management DB,
5003 Destination list management DB,

CITATION LIST

Patent Literature

PTL 1: Patent document 1: Japanese Unexamined Patent Application Publication No. 2010-506461
PTL 2: Patent document 2: Japanese Unexamined Patent Application Publication No. 2004-32305

The invention claimed is:

1. A transmission management system for managing a first transmission terminal and a second transmission terminal, the first transmission terminal and the second transmission terminal communicating with each other via a relay apparatus which relays data, the transmission management system comprising:
a reception unit configured to receive, from the first transmission terminal, band information which indicates whether a bandwidth of communication between the relay apparatus and the first transmission terminal is equal to or narrower than a predetermined value;
a determination unit configured to determine, based on a data volume of image data transmitted from the second transmission terminal, whether an image is a black image or a normal image and to transmit the black image or the normal image;
a transmission unit configured to transmit, to the first transmission terminal, a message which indicates that the image data transmitted from the second transmission terminal is hidden because the bandwidth is narrow, in response to an even in which the reception unit receives the band information which indicates that the bandwidth is equal to or narrower than the predetermined value;
a storage unit configured to store the message; and
a read out unit configured to read out the message from the storage unit in response to the event in which the reception unit receives the band information which indicates that the bandwidth is equal to or narrower than the predetermined value;
wherein the transmission unit is configured to transmit the message which is read out by the read out unit to the first transmission terminal.

2. The transmission management system as claimed in claim 1,
wherein the reception unit is configured to receive, from the first transmission terminal, terminal name displaying/hiding information which indicates whether a terminal name of the second transmission terminal is to be displayed, and
wherein the transmission unit is configured to transmit the terminal name of the second transmission terminal to the first transmission terminal in responsive to an even in which the reception unit receives the terminal name displaying/hiding information which indicates that the terminal name of the second transmission terminal is to be displayed.

3. The transmission management system as claimed in claim 2, further comprising:
   a management unit configured to manage terminal identification information for identifying a predetermined transmission terminal, and a terminal name of the predetermined transmission terminal in association with each other,
   wherein to reception unit is configured to receive specific terminal identification information for identifying the second transmission terminal, and
   wherein the read out unit is configured to read out the terminal name of the second transmission terminal which is managed by the management unit and corresponds to the specific terminal identification information, and
   wherein the transmission unit is configured to transmit the terminal name of the second transmission terminal, which is read out, to the first transmission terminal.

4. The transmission management system as claimed in claim 1, wherein, when the bandwidth is equal to or narrower than the predetermined value, the determination unit transmits the black image regardless of a type of the image data transmitted from the second transmission terminal.

5. A communication method executed by a transmission management system for manager a first transmission terminal and a second transmission terminal, the first transmission terminal and the second transmission terminal communicating with each other via a relay apparatus which relays data, the transmission management system including a storage unit configured to store a message which indicates that image data transmitted from the second transmission terminal is hidden because a bandwidth is narrow, the communication method comprising:
   a stage of receiving band information, from the first transmission terminal, which indicates whether the bandwidth of communication between the relay apparatus and the first transmission terminal is equal to or narrower than a predetermined value,
   a step of determining, based on a data volume of the image data transmitted from the second transmission terminal, whether an image is a black image or a normal image and transmitting the black image or the normal image;
   a step of reading out the message from the storage unit in response to an event in which the band information which indicates that the bandwidth is equal to or narrower than the predetermined value is received in the step of receiving, and
   a step of transmitting the message, which is read out, to the first transmission terminal.

6. A non-transitory recording medium for causing a computer to execute a process including each of the steps as claimed in claim 5.

* * * * *